United States Patent
Fong et al.

(10) Patent No.: US 9,235,545 B2
(45) Date of Patent: Jan. 12, 2016

(54) SINGLE WIRE CONCURRENT BI-DIRECTIONAL COMMUNICATION FOR PSU

(75) Inventors: Chee K. Fong, Cupertino, CA (US); Suet Fong Tin, Redmond, WA (US); Harjit Singh, Redmond, WA (US); Peter Atkinson, Sammamish, WA (US); Perry Stultz, Carnation, WA (US); Jeremy Braun, Seattle, WA (US); Duane M. Evans, Snohomish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 687 days.

(21) Appl. No.: 13/566,142

(22) Filed: Aug. 3, 2012

(65) Prior Publication Data

US 2014/0036734 A1  Feb. 6, 2014

(51) Int. Cl.
*G06F 13/42* (2006.01)
*G06F 1/26* (2006.01)
*H04L 5/14* (2006.01)

(52) U.S. Cl.
CPC ............ *G06F 13/4286* (2013.01); *G06F 1/266* (2013.01); *H04L 5/1423* (2013.01)

(58) Field of Classification Search
CPC .... G06F 13/4286; G06F 1/266; H04L 5/1423
See application file for complete search history.

(56) References Cited

U.S. PATENT DOCUMENTS 4,503,513 A * 3/1985 Pogue, Jr. ............. H03J 1/0025
                                                  455/152.1
5,657,324 A    8/1997 Itkin (Continued)

FOREIGN PATENT DOCUMENTS

WO        01/31801 A1      5/2001
WO    WO 0131801 A1 *      5/2001  .......... G06F 13/4286
WO        2010/010278 A1   1/2010

OTHER PUBLICATIONS

Okuno et ("Latest developments and practical evaluations of load-adaptive variable-frequency and PAM-based variable voltage high-frequency resonant inverter using static induction high-power transistors . . . "; Fifth International Conference on Power Electronics and Variable-Speed Drives; pp. 430-435; published Oct. 26, 1994.*

(Continued)

*Primary Examiner* — Andrew Lai
*Assistant Examiner* — Hoyet H Andrews
(74) *Attorney, Agent, or Firm* — Gregg Wisdom; Judy Yee; Micky Minhas

(57) ABSTRACT

A communication system where first and second devices communicate concurrently and bidirectionally over a single wire and a ground. The second device can be a computing device having a powered component which requires a certain power output, for instance, and the first device may be a power supply unit. The second device provides a signal on a control line (the single wire) which is characterized by a frequency, pulse width, duty cycle and/or an amplitude which is associated with a message from the second device. The first device recognizes the message in the signal and invokes a corresponding function, such as by enabling a corresponding power supply. The power supply provides power to the second device via a separate power line. Further, the first device modifies the signal, without adding power, to provide a message from the first device, concurrent with the message from the second device.

20 Claims, 10 Drawing Sheets

(56) References Cited

U.S. PATENT DOCUMENTS

| | | | |
|---|---|---|---|
| 5,864,872 A | 1/1999 | Lee et al. | |
| 6,412,072 B2 | 6/2002 | Little et al. | |
| 7,095,756 B2 * | 8/2006 | Binder | H04B 3/54 370/502 |
| 7,433,596 B2 | 10/2008 | Harres | |
| 7,639,598 B2 | 12/2009 | Sovenyi | |
| 7,782,240 B2 | 8/2010 | Ng et al. | |
| 8,150,264 B2 * | 4/2012 | Tang | H04Q 11/0066 370/389 |
| 8,509,318 B2 * | 8/2013 | Tailliet | G06F 13/4295 320/145 |
| 2002/0027689 A1 * | 3/2002 | Bartur et al. | 359/152 |
| 2003/0097482 A1 * | 5/2003 | DeHart | H04L 29/06 709/253 |
| 2007/0147844 A1 | 6/2007 | Harres | |
| 2009/0008503 A1 | 1/2009 | Lloyd | |
| 2009/0060531 A1 * | 3/2009 | Biegert et al. | 398/214 |
| 2009/0121825 A1 | 5/2009 | Har | |
| 2010/0049994 A1 * | 2/2010 | Ghoshal | 713/300 |
| 2011/0040988 A1 | 2/2011 | Wang et al. | |
| 2011/0150065 A1 * | 6/2011 | Tailliet | G06F 13/4295 375/224 |
| 2012/0140527 A1 | 6/2012 | Fong et al. | |

OTHER PUBLICATIONS

"International Search Report & Written Opinion for PCT Patent Application No. PCT/US2013/053108", Mailed Date: Nov. 29, 2013, Filed Date: Aug. 1, 2013, 9 Pages.

English Abstract of PCT Publication No. WO2010010278 published on Jan. 28, 2010.

Pham, Bich, et al., "One-Wire Serial Bus Carries Isolated Power and Data," [http://electronicdesign.com/article/power/one-wire-serial-bus-carries-isolated-power-and-dat], published Oct. 13, 2005, 2 pages.

"Single-Wire Power Transmission," Jules Scalar EM Research, retrieved from http://semresearch.wordpress.com/index/single-wire-power-transmission, Apr. 17, 2012, 5 pages.

"Single-Wire Serial Bus Carries Isolated Power and Data," Application Note 3754, Maxim, retrieved from http://www.maxim-ic.com/an3754, Mar. 23, 2006, 3 pages.

Sitter, Nicholas J., "Two-wire, low component count soil temperature sensor," Theses and Dissertations, University of Iowa, [http://ir.uiowa.edu/etd/1081], May 2011, 88 pages.

Salvatore, Damino, "1-Wire Field Standard Protocol," Theoretic/Practical course on BASCOM 8051 Programming, Feb. 14, 2012, 17 pages.

* cited by examiner

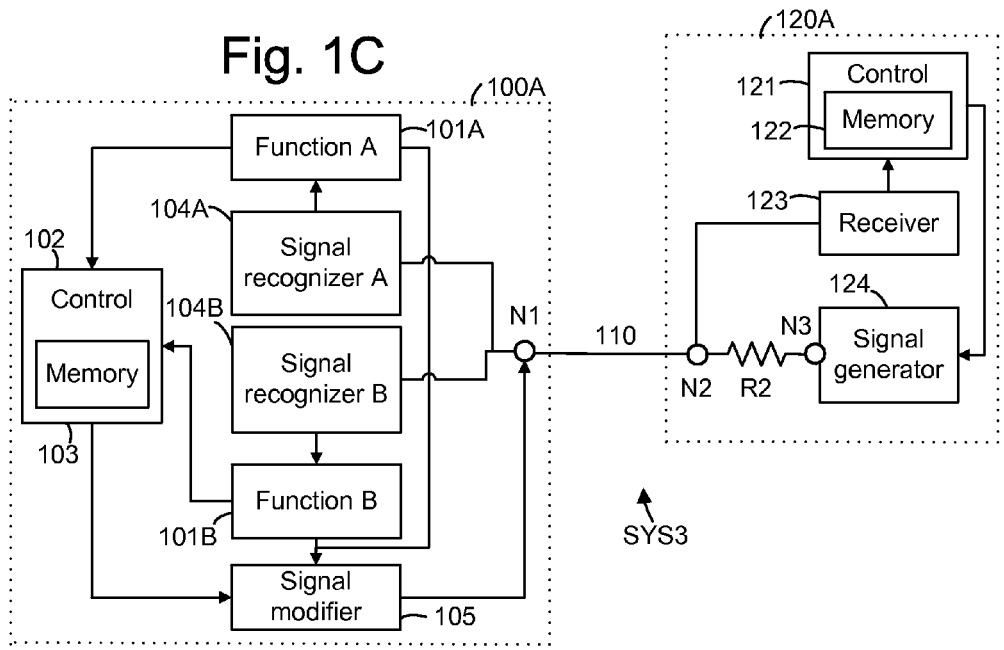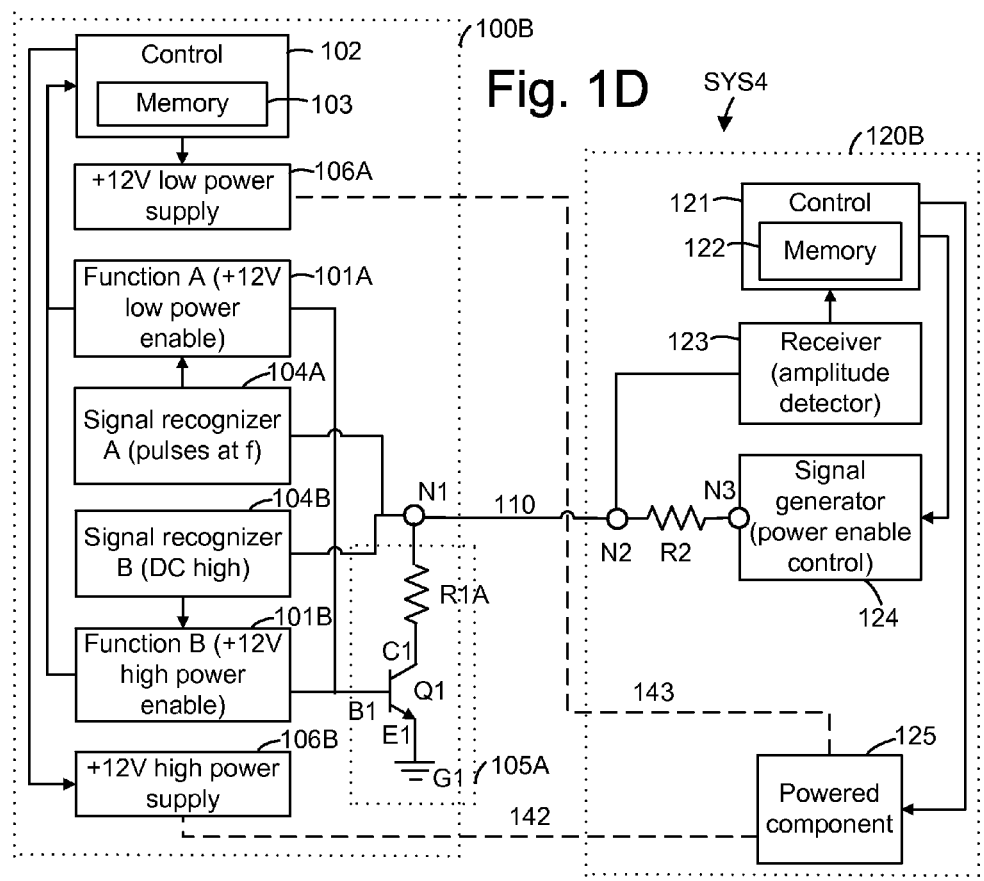

SINGLE WIRE CONCURRENT BI-DIRECTIONAL COMMUNICATION FOR PSU

BACKGROUND

Devices in a communication system communicate with one another, e.g., to exchange information or to make requests. For example, a request may be made from a computing device to a power supply unit for a specific power supply to be provided to a component within the computing device, such as a microprocessor, a disk drive or a fan, or a component external to the computing device, such as another computing device or a sensor. In some cases, the power supply unit can convert AC mains power to a low voltage regulated DC power which has current and voltage characteristics which are appropriate for the load. In another example, a sensor may report data such as readings or diagnostic data to a master device using a modulation scheme.

However, existing communication systems are not optimized in terms of communication time, cost and flexibility.

SUMMARY

Technology described herein provides a communication system in which first and second devices communicate with one another. In one approach, the communication is bidirectional and concurrent over one wire. The second device may provide a message via a signal on a control line which extends between the first and second devices. The first device receives and recognizes the message and may take some requested action, for instance. Further, the first device sends a message to the second device by modifying the signal but not adding power to it. For example, the voltage of the signal can be pulled down either continuously or periodically to provide a modified signal. The second device recognizes the modified signal and can take a corresponding action.

In one approach, a communication system includes a first device connected to a first end of a control line, such as a conductive wire, and a second device connected to a second end of the control line. The second device comprises a signal generator and a receiver, which are both connected to the second end of the control line. The signal generator generates a signal at the second end of the control line, where the signal represents a message from the second device to the first device. For example, the message may be a request to provide a specific power output, data which is reported from a sensor, or other information. The first device comprises a signal recognizer and a signal modifier, which are both connected to the first end of the control line. The signal recognizer recognizes the message from the second device from the signal. For example, the signal may be characterized by a frequency, pulse width, duty cycle and/or an amplitude which is associated with the message from the second device. The message can comprise one or more bits of data, for instance.

The signal modifier of the first device is responsive to the signal recognizer to provide a modification of the signal, where the modification of the signal represents a message from the first device to the second device. The receiver of the second device recognizes the message from the first device from the modification of the signal and takes some corresponding action. For instance, in the case of a request for a specific power output, the second device may be a control which instructs a powered component to power on, when the message from the first device is a confirmation that the requested power output is ready, e.g., on a power line separate from the control line. In the case of a report of sensor data, the message from the first device may be a confirmation that the sensor data was received. Or, based on processing of the sensor data by the first device, the message from the first device may instruct the second device to continue taking readings, stop taking readings, take readings more or less often and so forth. The modified signal on the control line can include the messages from both the first and second devices concurrently so that one device does not have to wait for the other to finish before providing its respective message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Like-numbered elements correspond to one another in the figures.

FIG. 1C depicts another example implementation of a communication system SYS3 based on the communication system of FIG. 1A, including a first device 100A which can enable functions A and B, and a second device 120A.

FIG. 1D depicts further details of a communication system SYS4 based on the communication system of FIG. 1C, including a first device 100B which can enable power supply function A or B and modify a signal on the control line when the power supply function A or B is enabled, and a second device 120B which includes a powered component 125.

FIGS. 3A-4C depict example waveforms of signals which can be used on a control line in a communication system as described herein, where each signal includes an initial unmodified waveform portion followed by a modified waveform portion.

FIG. 3A depicts an example of a signal which includes an unmodified DC waveform portion 300 or 302 at an initial level, followed by a modified DC waveform portion 302 or 303, respectively, at a reduced DC level.

FIG. 4C depicts an example of a signal which includes the unmodified DC waveform portion 400 of FIG. 4A followed by a modified waveform portion 429 in which amplitude modulation is used to convey data.

DETAILED DESCRIPTION

Figure 1A:
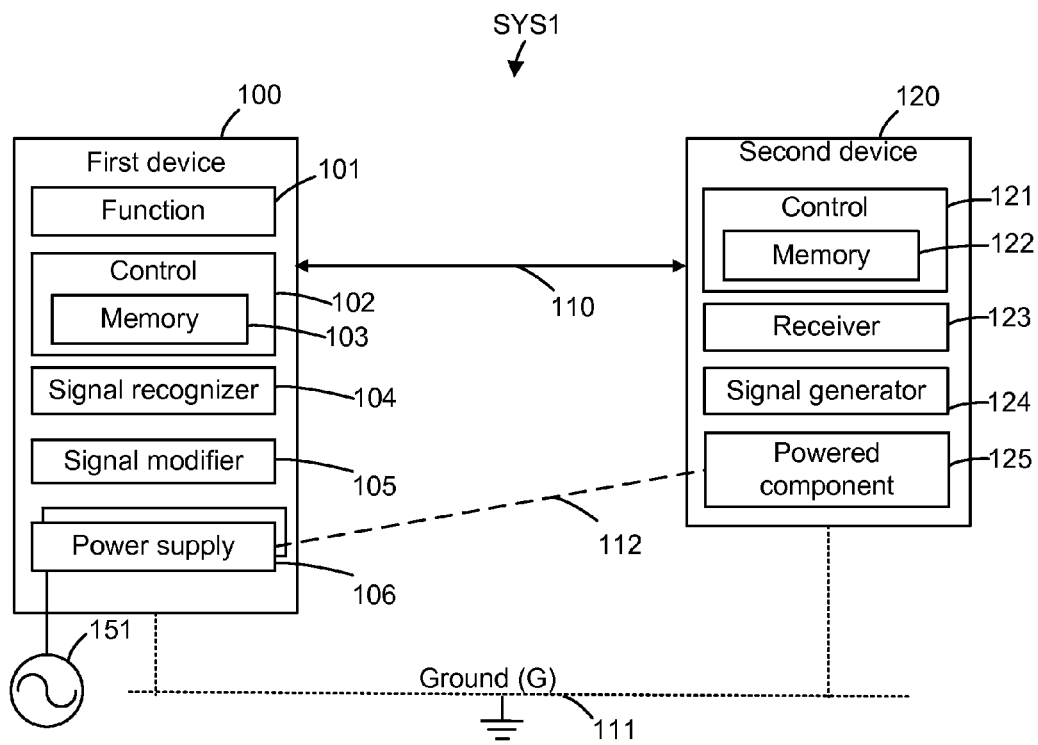
FIG. 1A depicts an example of a communication system SYS1 in which a first device 100 communicates with a second device 120 via a single control line 110 and a ground 111.

The technology described herein includes a communication system in which first and second devices can communicate with one another bidirectionally and concurrently over one data-carrying wire. Examples of a communication system occur in computing systems, for instance, where various components can communicate with one another. Generally, one device can ask another device to perform a function. For instance, a control may send a request for a specific power output to a power supply unit, on behalf of another component which requires power to operate. In response, the power supply unit can turn on a power supply and inform the control that the specific power output is ready to use. The control, in turn, can activate the component, knowing that the component will operate properly using the specific power output. For example, a component such as a disk drive or a cooling fan may use power at 12 V, while a component such as a peripheral or microprocessor may use power at 3.3 V or 5 V. Moreover, a low or high power output can be provided at a given voltage such as 12 V. The requested function may be to enable a specific power output and to report when the specific power output is ready. In another example of a communication system, a sensor communicates data to another device. Many other examples of communication systems exist.

With the communication systems described herein, bidirectional communications can take place between devices over a single control line wire and a ground wire. Moreover, the bidirectional communications can be concurrent. This provides advantages in terms of communication time, cost and flexibility. For example, cost is reduced compared to bidirectional communications which use a separate wire for each direction, e.g., a first wire for communication from a first device to a second device, and a second wire for communication from the second device to the second device. Communication time is reduced, and flexibility is improved, compared to bidirectional communications between devices which use a master-slave relationship to take turns communicating on a single wire. In this case, the master device informs the slave device of when it may communicate, and communications occur serially rather than concurrently. Multiple slave devices may communicate in turn with one master device. However, the master-slave approach restricts the ability of the devices to communicate, additional time is consumed by the serial communications, and additional intelligence is needed to coordinate the communications. In any case, an additional ground wire is used as well as reference from which the potential on the other wire or wires is defined.

Techniques provided herein allow bidirectional communication to occur concurrently on a single wire by using one device (e.g., a first device) to modify a signal which is generated by another device (e.g., a first device), without adding power to the signal, in one possible implementation. For example, the second device may use an active component (which consumes power) such as a signal generator. The first device may use passive components such as resistors, transistors and/or capacitors, which may consume power but do not add power to the signal. The first device may use active components additionally but without adding power to the signal, in one possible implementation. Further, the devices are not required to share a common clock or to otherwise be synchronized. In one approach, the signal is modified by having its voltage pulled low in a fixed or periodic manner to cause a change in amplitude, duty cycle, pulse width and/or frequency which is sensed by the second device. Various signaling and modulation techniques may be used. A low pass filter may be used to isolate a portion of the first device from high-frequency variations which are introduced in the signal voltage.

FIG. 1A depicts an example of a communication system SYS1 in which a first device 100 communicates with a second device 120 via a single control line 110 and a ground 111. A first device 100 includes a function 101, a control 102, an associated memory 103, a signal recognizer 104, a signal modifier 105 and one or more power supplies 106. The first device, e.g., the one or more power supplies, can be connected to a power source 151 such as AC mains, e.g., wall power, via a plug and socket such as depicted in FIG. 1G. A second device 120 includes a control 121, an associated memory 122, a receiver 123, a signal generator 124 and a powered component 125 (e.g., a component which uses power when operating). A control line (CL) 110 and a power line (PL) 112 extend between the devices, and the devices communicate with a common ground (G) 111. The control line and the power line can be separate cables/wires or other conductive elements. The control line and the power line can be metal. The control line can be a power enable line when it is used to enable a power output of the first device.

The control line is (exactly) one wire, where communication between the first device and the second device is bidirectional and concurrent over the one wire. For example, the one wire may have a fixed or time-varying potential with respect to ground which provides the communication. The one wire is one path of conductive material such as metal.

In one approach, each item is implemented by hardware and, in some cases, software. The function 101 can represent one or more functions which the first device can perform on behalf of the second device, such as enabling the power supply 106, or communicating a message to the second device, using the signal modifier 105. In one approach, the first device is capable of performing any of multiple functions in response to a message from the second device which identifies one or more of the functions to be invoked. In one approach, the function is responsive to the signal recognizer 104 and, in turn, communicates with the control 102. The control, in turn, can communicate with the signal modifier and the power supply.

In an example implementation, the first device is a power supply unit and the second device is a computing device such as a PC, laptop, game console, tablet, smart phone, portable media player, digital camera, smart appliance, home automation system or the like.

The controls 102 and/or 121 can include one or more processors which execute instructions stored on one or more tangible, non-transitory processor-readable storage devices (e.g., memory 103 and 122, respectively) for performing processor- or computer-implemented methods described herein. At least one processor or control circuit can also include the one or more tangible, non-transitory processor-readable storage devices, or other non-volatile or volatile storage devices. The storage device, as a computer-readable media, can be provided, e.g., by memory 103 and 122.

Alternatively, the controls 102 and/or 121 do not include associated memories, and are hardware circuits which do not execute code.

The signal recognizer 104 recognizes a message in a signal which is received on the control line from the second device. For example, a message may be recognized by one or more signal characteristics such as at least one of a frequency, a pulse width, a duty cycle and an amplitude. The signal modifier 105 comprises circuitry which modifies the signal, such as by pulling its voltage low in a fixed or periodic manner to cause a change in one or more signal characteristics. A signaling system may be defined which allows the first device to identify a message based on one or more characteristics of the initial, unmodified signal which is output by the signal generator 124 of the second device, and to allow the second device to identify a message based on one or more characteristics of the modified signal.

The power supply 106 represents one or more power supplies of the first device which can provide power to a powered component 125. One or more components may be powered concurrently.

Various details of the elements of FIG. 1A are provide in example implementations in the following discussion.

Figure 1B:
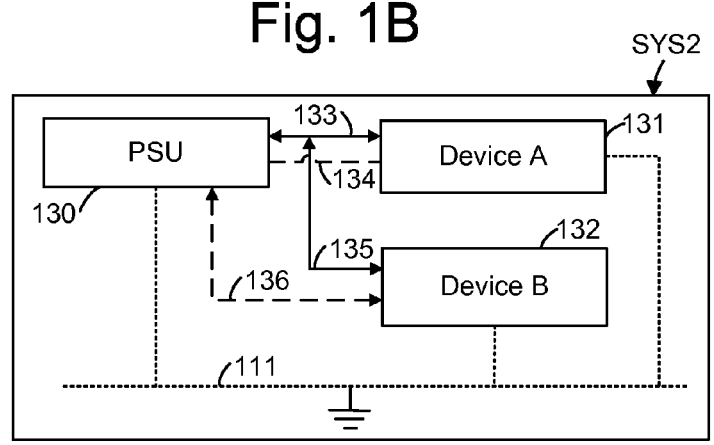
FIG. 1B depicts an example implementation of a communication system SYS2 based on the communication system of FIG. 1A in which a power supply unit (PSU) 130 is an example of the first device, and a device A 131 and a device B 132 are each an example of the second device.

FIG. 1B depicts an example implementation of a communication system SYS2 based on the communication system of FIG. 1A in which a power supply unit (PSU) 130 is an example of the first device, and a device A 131 and a device B 132 are each an example of the second device. In this case, a single PSU communicates with multiple devices which have powered components. This may occur, e.g., when the single PSU has a power supply which is suitable for the powered components of the multiple devices. For example, the PSU and device A communicate via a control line 133, and the PSU and device B communicate via a control line 135. A power line 134 extends between the PSU and device A, while a power line 136 extends between the PSU and device B. In another approach, a single device which has multiple powered components may communicate with multiple PSUs. This may occur, e.g., when the multiple powered components require the power supplies of multiple PSUs. The ground 111 may be shared.

FIG. 1C depicts another example implementation of a communication system SYS3 based on the communication system of FIG. 1A, including a first device 100A which can enable functions A and B, and a second device 120A. The first device 100A includes a function A 101A which is responsive to a signal recognizer A 104A, and a function B 101B which is responsive to a signal recognizer B 104B. The control 102, e.g., control circuit, is responsive to the function A 101A or the function B 101B, and the signal modifier 105 is responsive to the control 102. Optionally, or additionally, the signal modifier is directly responsive to function A or B. The functions could be incorporated into the respective controls as well.

This example includes two functions, but one or more functions can be provided. As an example, the two functions can be different power supplies. At the first device, the signal recognizers, e.g., signal recognition circuits, are connected to the one end of the control line at a node N1 and can recognize a signal on the control line. At the second device, the signal generator 124 is responsive to the control 121 and provides a signal at a node N3 at an opposite end of the control line. A resistor R2 is between N2 and N3. N3 represents a first end of the control line, and N1 represents a second end of the control line.

The receiver 123 is connected to the control line at a node N2. The control 121 is responsive to the receiver 123. R2 prevents the signal generator 124 from being overloaded when the signal modifier 105 pulls the signal to ground. An impedance of several hundred ohms to a few thousand ohms, for instance, may be used depending on the length of the control line and the strength of the signal generator output.

In one approach, at the first device, each signal recognizer receives the unmodified signal which is generated by the signal generator and attempts to recognize a signal characteristic which is specifically associated with the signal recognizer. For example, a signal amplitude, frequency or other signal characteristic may be associated with the signal recognizer A, and another signal amplitude, frequency or other signal characteristic may be associated with the signal recognizer B. For instance, a certain amplitude of the signal may be associated with signal recognizer A, while a certain frequency of the signal may be associated with signal recognizer B. Or, one level of a certain signal characteristic may be associated with the signal recognizer A, while another level of the same certain signal characteristic is associated with the signal recognizer B. For instance, a first amplitude of the signal may be associated with signal recognizer A, while a second amplitude of the signal may be associated with signal recognizer B. Many variations are possible. For instance, in the case of three signal recognizers A, B and C, a third amplitude of the signal may be associated with signal recognizer C and a function C.

In another approach, multiple functions are invoked by a same signal characteristic/message. For example, both functions A and B may be invoked simultaneously when the signal has a certain amplitude or frequency. Or, the use of another signal amplitude may indicate that neither function A nor B should be invoked.

The presence of a certain signal characteristic can be interpreted as a message to the first device from the second device. The message can be, e.g., "perform function A," "perform function B," "perform functions A and B" or "stop performing function A." For instance, one signal amplitude may be interpreted as a message to "perform function A" while another signal amplitude may be interpreted as a message to "perform function B." Or, the message can carry more data. For example, a modulated signal can provide a message of multiple bits of data.

Similarly, the signal modifier can provide a modification of the signal to provide a modified signal with one or more characteristics which represent a message from the first device to the second device. At the second device, these one or more characteristics are recognized by the receiver 123 and reported to the control 121 which can take a corresponding action.

Note that the roles of the first and second devices can be reversed as well.

Example signal characteristics which can be used for communicating are provided in FIGS. 3A-4C.

FIG. 1D depicts further details of a communication system SYS4 based on the communication system of FIG. 1C, including a first device 100B which can enable power supply function A or B and modify a signal on the control line when the power supply function A or B is enabled, and a second device 120B which includes a powered component 125. The power supply 130 of FIG. 1B is represented by a +12V low power supply 106A (e.g. 15 Watt) and a +12V high power supply 106B (e.g., 215 W). The power supplies may be connected to an AC power source such as wall power or a DC power source such as a battery, for instance.

Function A 101A is a +12V low power enable function and function B 101B is a +12V high power enable function. The signal recognizer A 104A recognizes pulses in the signal at a certain frequency f and the signal recognizer B 104B recognizes a DC high signal (e.g., a signal with an amplitude exceeding a specified level). For example, the signal recognizer A 104A can include a high pass filter which allows high frequency signal components to pass while blocking low frequency signal components. Similarly, the signal recognizer B 104B can include a low pass filter which allows a low frequency signal component to pass while blocking high frequency signal components.

The receiver 123 comprises an amplitude detector and the signal generator 124 acts as a power enable control. Further, the powered component 125 can receive power from the +12V low power supply 106A via a power line 143, or from the +12V high power supply 106B via a power line 142.

The signal modifier 105A (representing the signal modifier 105 of FIG. 1B or 1C) is provided by additional circuitry including a transistor Q1 and a resistor R1A in a path between the node N1 and ground G1. The transistor can be an NPN bipolar junction transistor, for instance, having a base (B1), collector (C1) and emitter (E1) terminals. When either of the functions A or B is invoked, a voltage is applied to the base of the transistor, causing charge to flow between the emitter and collector terminals, and thereby causing the node N1 to be coupled to ground. A voltage drop develops between base and emitter while the base current exists. When N1 is coupled to ground, the voltage of the signal output by the signal generator is dropped across R2 and R1A in a voltage divider. For example, with a voltage V at N3 (same as at N1), the voltage across R2 is V×R2/(R1A+R2) and the voltage across R1A is V×R1A/(R1A+R2). In a simple example, assume R1A=R2 so that the voltage across each of R1A and R2 is ½×V. Thus, the transistor acts as a switch which pulls down the voltage of the signal on the control line by 50%. The drop in the signal voltage is detected by the receiver 123 and reported to the control 121. When N1 is not coupled to ground, the voltage at N1 is equal to the voltage at N2.

R2 prevents the signal generator 124 from being overloaded when N1 is grounded.

Figure 3A:
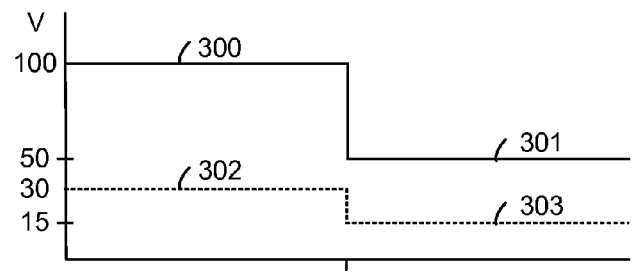
Figure 3B:
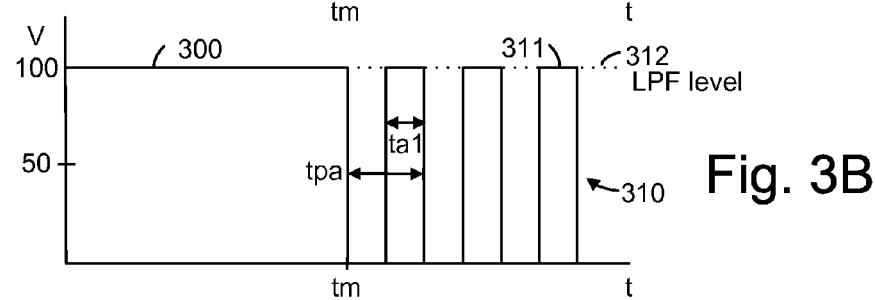
FIG. 3B depicts an example of a signal which includes the unmodified DC waveform portion 300 of FIG. 3A, followed by a modified AC portion 310 having a first frequency 1/tpa and a first duty cycle ta1/tpa.
Figure 3C:
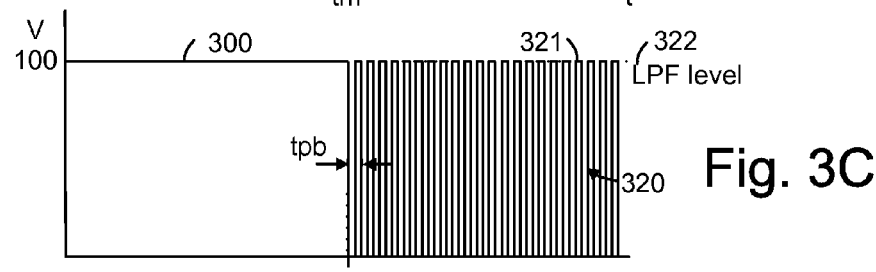
FIG. 3C depicts an example of a signal which includes the unmodified DC waveform portion 300 of FIG. 3A, followed by a modified AC portion 320 having a second frequency 1/tpb.
Figure 3D:
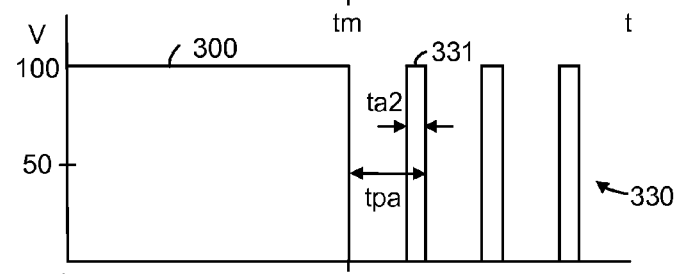
FIG. 3D depicts an example of a signal which includes the unmodified DC waveform portion 300 of FIG. 3A, followed by a modified AC portion 330 having the first frequency 1/tpa of FIG. 3B and a second duty cycle ta2/tpa.
Figure 3E:
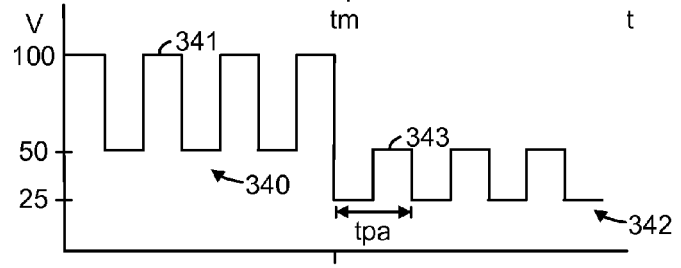
FIG. 3E depicts an example of a signal which includes an unmodified AC portion 340, followed by a modified AC waveform portion 342 at a reduced amplitude, where the frequency 1/tpa of FIG. 3B and duty cycle are constant through the signal.
Figure 3F:
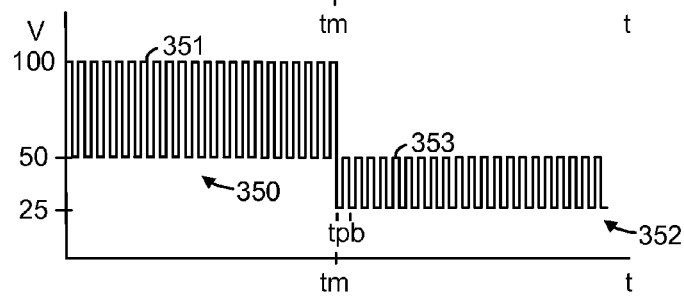
FIG. 3F depicts an example of a signal which includes an unmodified AC waveform portion 350, followed by a modified AC waveform portion 352 at a first reduced amplitude (50% reduction), where the frequency 1/tpb of FIG. 3C and duty cycle are constant through the signal.
Figure 3G:
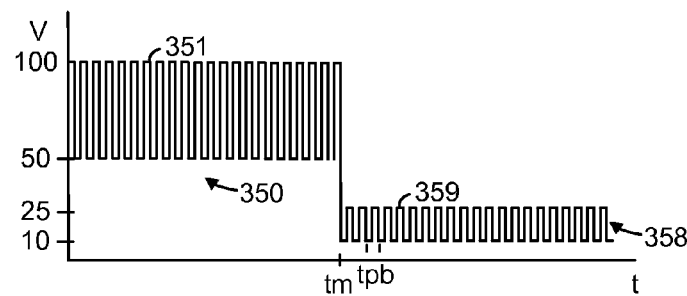
FIG. 3G depicts an example of a signal which includes an unmodified AC waveform portion 350, followed by a modified AC waveform portion 358 at a second reduced amplitude (75% reduction), where the frequency 1/tpb of FIG. 3C and duty cycle are constant through the signal.

For instance, assume the signal generator 124 provides a signal on the control line having a frequency f, such as in FIGS. 3E-3G (e.g., f=10 Hz), and a peak amplitude of 3.3 V. The signal from the second device may be a message requesting the +12V low power supply (function A). The signal recognizer A recognizes the pulses at the specified frequency, and enables the function A. The function A informs the control 102 that it has been enabled, and provides a voltage at the base of the transistor Q1 which connects N1 to ground, thereby pulling down the voltage of the signal, e.g., from the peak amplitude of 3.3 V (waveform portion 340 in FIG. 3E or waveform portion 350 in FIG. 3F) to a peak amplitude of 1.65 V (waveform portion 342 in FIG. 3E or waveform portion 352 in FIG. 3F). Further, the control 102 is responsive to function A for enabling the +12V low power supply on power line 143. For example, the control 102 can activate the +12V low power supply 106A, or connect the +12V low power supply to the power line 143. The receiver 123 receives the modified signal at the reduced amplitude and informs the control 121. The control is thereby informed that the +12V low power supply is ready to be used, and can respond by instructing the powered component 125 to turn on and begin operating. The powered component 125 turns on, drawing the 12V low power from power line 143. The drop in signal amplitude is interpreted by the control 121 as a reply message from the first device indicating that the requested power supply is available.

As another example, assume the signal generator 124 provides a DC signal on the control line having an amplitude of 3.3 V, such as using waveform portion 300 in FIG. 3A. The signal from the second device in this case is a message requesting the +12V high power supply (function B). The signal recognizer B recognizes the amplitude and enables the function B. The function B informs the control 102 that it has been enabled, and provides a voltage at the base of the transistor Q1 which connects N1 to ground, thereby pulling down the voltage of the signal, as shown by waveform portion 301 in FIG. 3A. Further, the control 102 is responsive to function B for enabling the +12V high power supply on power line 142. For example, the control 102 can activate the +12V high power supply 106B, or connect the +12V high power supply to the power line 142.

In one approach, a currently invoked function can be disabled by the control 102 when another, conflicting function is enabled. Or, a currently invoked function can be disabled when a disable instruction is received from the second device. In another option, a function is enabled as long as a corresponding request is being received from the second device, and the removal of the request results in the disabling of the function. Other approaches are possible as well.

The receiver 123 receives the modified signal at the reduced amplitude and is thereby informed that the +12V high power supply is ready to be used. In response, the control 121 can turn on the powered component 125. The powered component 125 turns on, drawing the 12V high power from power line 142.

If the second device wants to change back from high power to low power, it can again transmit the 10 Hz pulses. The high power 12V is disabled and the transistor Q1 is turned off to remove the pull down of the signal, since the signal recognizer B no longer recognizes the fixed 3.3 V signal. The low power supply is enabled since the signal recognizer A again recognizes the 10 Hz pulses. Without the pull down, the pulses then return to their full amplitude at 3.3V. When the second device wants to turn off both the low and high power supplies, it can change the signal to 0 V, for instance. When the first device receives the 0 V, it will shut off both the low and high power supplies.

Note that multiple powered components and/or power supplies can be provided. For example, a first powered component may use the +12V low power supply while a second powered component may use the +12V high power supply at the same time.

In another option, by looking at the voltage level or other characteristic of the modified signal, the second device can identify what type of power the first device is supplying. Or, the characteristic of the modified signal can provide information such as identifying information (e.g., manufacturer, version) of the first device. The second device can use this to determine if the first device is compatible with it. If the first device is compatible, the second device can proceed to use it such as to draw power. If the first device is incompatible, the second device can use a substitute device or declare an error, for instance.

Referring to FIGS. 3E-3G, note that the signal on the control line continues to have the characteristic which is provided by the signal generator (e.g., the frequency f) and well as the characteristic which is provided by the signal modifier 105A (e.g., the reduced amplitude). Thus, the modified signal includes, concurrently, the message of the second device by the frequency and the message of the first device by the amplitude. FIGS. 3E and 3F provide an example of a 50% reduction in amplitude, and FIG. 3G provides an example of a 75% reduction in amplitude. The portion of the signal before a time denoted by "tm" in FIGS. 3E-3G represents the original, unmodified signal as output from the signal generator, and the portion of the signal after "tm" represents the modified signal. The receiver 123 can detect the signal amplitude in different ways. In one approach, the peak amplitude is detected, so that the peak amplitude of the unmodified signal is 100 (e.g., 100%) and the peak amplitude of the modified signal is 50 (e.g., 50%).

In this example, the signal modifier is made by a direct output from function A or B to the transistor. In other implementations, an output from the control 102 is provided to the transistor. For instance, the control can provide a time-varying pull down of the signal to impart the signal with a frequency, duty cycle, pulse width modulation or amplitude modulation which represents a message from the first device.

In one approach, the message from the second device is a request for the first device to provide a first power supply from among a plurality of power supplies 106A and 106B of the first device, and the message from the first device indicates to the second device that the first power supply is ready on a power line, separate from the control line.

In another approach, the message from the second device is a request for the first device to provide a first power output from among a plurality of power outputs of the first device; and the message from the first device indicates to the second device that the first power output is ready on a power line, separate from the control line.

In another approach, the message from the second device is a request for the first device to perform a function; and the message from the first device indicates to the second device that the function has been performed.

In another approach, the message from the second device is a request for the first device to identify a frequency of an alternating current mains power supply used by the first device; and the message from the power supply unit identifies the frequency.

In another approach, the message from the second device comprises a request for a specific power output, the first device comprises at least one power supply which provides the specific power output on a power line, responsive to the signal recognizer, and the message from the power supply unit as a second device indicates that the specific power output is ready.

Figure 1E:
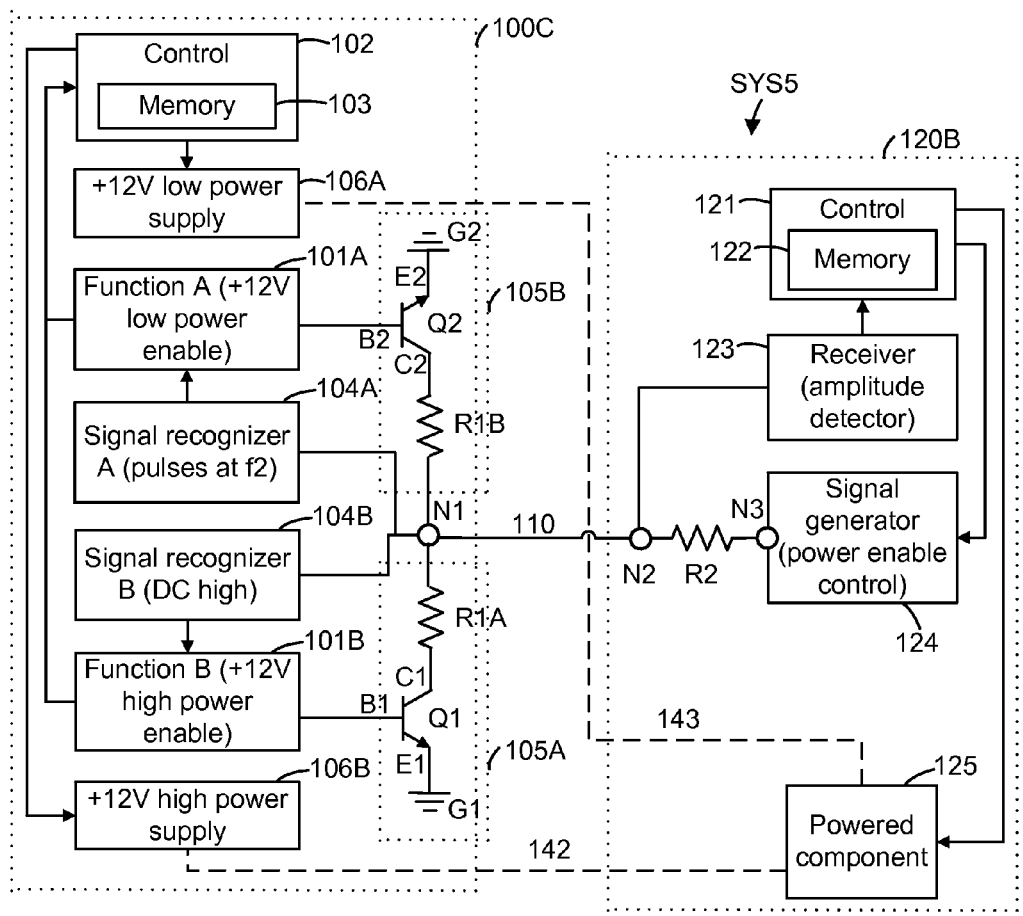
FIG. 1E depicts a communication system SYS5 as an alternative to the communication system of FIG. 1D, including a first device 100C which can enable a power supply function A or B and modify a signal on the control line according to which function is enabled, and the second device 120B.

FIG. 1E depicts a communication system SYS5 as an alternative to the communication system of FIG. 1D, including a first device 100C which can enable a power supply function A or B and modify a signal on the control line according to which function is enabled, and the second device 120B. This example allows a function-specific modification of the signal according to the specific function which is enabled. A different message is communicated from the first device to the second device according to the specific function which is enabled.

An additional signal modifier 105B, analogous to the signal modifier 105A is provided, includes a transistor Q2 with collector C2, base B2 and emitter E2, to connect N1 to ground G2 when the function A is enabled and provides a voltage at B2. The resistors R1B and R1A can differ, so that the modified voltages also differ. For example, as discussed, the signal modifier 105A can be used to provide a 50% pull down when R1A=R2. In one approach, the signal modifier 105B can be used to provide a 75% pull down when R1B=3×R2. With a voltage V at N3, the voltage across R1B is V×R1B/(R1B+R2). FIG. 3G provides an example of a 75% reduction in amplitude. The waveform portion 350 represents the original signal and the waveform portion 358 represents the modified signal with a 75% pull down. The peak amplitude is reduced from 100% to 25%. The transistors Q1 and Q2 can be considered to be first and second switches to ground, respectively.

Figure 1F:
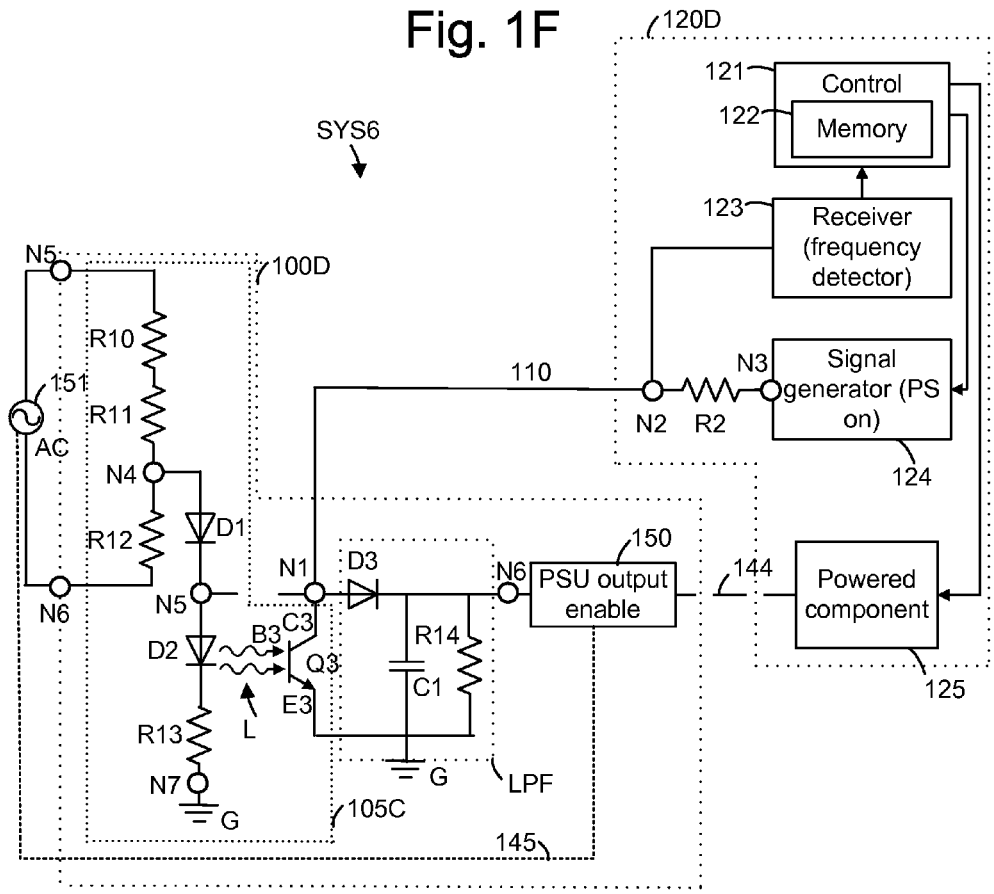
FIG. 1F depicts a communication system SYS6 which is another example implementation of the communication system of FIG. 1A, including a first device 100D which can modify a signal on the control line using an AC waveform, and a second device 120D.
Figure 1G:
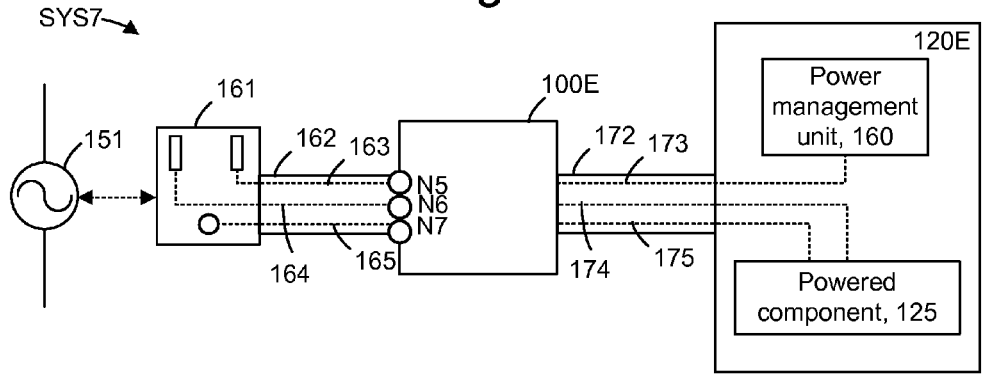
FIG. 1G depicts a communication system SYS7 which is another example implementation of the communication system of FIG. 1A, including a first device 100E as a power supply unit which plugs into a wall socket and which is connected to a computing device as a second device 120E.

FIG. 1F depicts a communication system SYS6 which is another example implementation of the communication system of FIG. 1A, including a first device 100D which can modify a signal on the control line using an AC waveform, and a second device 120D. In this example, the signal on the control line is modified using an opto-coupler which comprises a light-emitting diode D2 (a light emitter) emitting light L to a phototransistor Q3. An AC signal, such as depicted by the signal 377 in FIG. 3J, is generated by an AC signal generator such as an AC mains power source 151. The AC signal can be a sine wave, for instance, which varies between a positive peak +Vpeak and a negative peak −Vpeak with a frequency f and has a time-varying voltage expressed by $v(t)=Vpeak \times \sin(2\pi ft)$. The AC signal is half-wave rectified by a diode D1, which passes only positive values of v(t), to provide a half-wave AC signal, such as depicted by the signal 378 in FIG. 3J. The opto-coupler isolates the high power (e.g., 110 V) AC signal from the reminder of the system.

The half-wave AC signal cause the transistor Q3 to switch between conductive and non-conductive states, such as depicted by the waveform portion 379 in FIG. 3J. For example, the transistor Q3 is conductive from t0-t1, t2-t3 and t4-t5 and non-conductive from t1-t2 and t3-t4 in FIG. 3J. The voltage of the signal is pulled down when the transistor is in a conductive state and not pulled down when the transistor is in a non-conductive state. The voltage of the signal is pulled down to ground when the transistor is in a conductive state. If a resistor were added between N1 and C3, the voltage of the signal would be pulled down to a non-zero level which is equal to the voltage across the resistor.

The signal modifier 105C includes the depicted components. Specifically, the AC mains power source 151 is in parallel with resistors R10-R12. R10 and R11 have a large resistance to reduce the voltage across R12. A node N4 connects the AC signal to a node N5 via the diode D1, and the diode D2 connects the node N5 to ground via a resistor R13. The phototransistor Q3 has a collector C3, a base B3 and an emitter E3, and is a switch which connects the node N1 to ground. The phototransistor Q3 is in parallel with a low pass filter (LPF) which provides a low pass filtered version of the unmodified or modified signal on the control line to a node N6 of a component such as a PSU output enable component 150 (an output enable node). The LPF includes a diode D3, a capacitor C1 and a resistor R14. R14 allows C1 to discharge faster when the signal is not present. The LPF provides the node N6 with a relatively fixed amplitude signal by isolating N6 from the AC modulations to the signal at N1. For example, FIGS. 3B and 3C depict modified signals 310 and 320, respectively, which can be provided by the signal modifier 105C (FIG. 1F). Corresponding low-pass filtered levels as indicated by lines 312 and 322 (FIGS. 3B and 3C) are substantially the same as the fixed amplitude of the unmodified signal or waveform portion 300 (100%).

In one approach, the signal modification comprises a periodic pull down of a voltage of the signal responsive to the alternating current mains power supply, and the low pass filter provides a low pass filtered version of the signal with the voltage periodically pulled down to a power output enable node.

At the second device, the receiver 123 acts as a frequency detector to detect the AC modulations of the modified signal on the control line. In an example implementation, the signal generator provides a "power supply on" message to the first device. For example, the unmodified signal can have a fixed amplitude of 3.3 V (e.g., 100% as indicated by waveform portion 300 in FIGS. 3B and 3C) which causes the PSU output enable component 150 to output power on an associated power line 144 to the powered component 125. The fixed amplitude of 3.3 V can be considered to be a "DC high" signal. At the same time, the AC modulations can be continuously provided on the control line via the opto-coupler. A control such as a microprocessor is not required to cause the signal modification.

In one approach, the PSU output enable component 150 receives power from the power source 151 via line 145.

The receiver 123 detects the modified signal with the AC modulations and interprets it as a message from the first device. For example, the message may identify the AC mains frequency (the power line frequency). The message may identify the AC mains frequency by a frequency component of the modified signal which is the same as the AC mains frequency, for instance. Or, the message may identify the AC mains frequency in another way such as by an encoded message. Thus, the message from the second device can be a request for the first device to identify an alternating current (AC) mains frequency of the first device, and the message from the first device can identify the AC mains frequency.

The control 121 may use this information to inform the powered component to operate at this AC mains frequency. For example, AC mains frequency is 60 Hz in the US and 50 Hz in many other countries. An example implementation uses R10=R11=1.5 MΩ, R12=160 kΩ, C1=1 µF and R14=300 kΩ. The modified signal at N1 (comprising pulses) is received at N6 as the "DC high" signal due to the LPF. The control 121 may be in a power management unit of a computing device, for instance.

Optionally, the AC signal generator may have the ability to set its frequency within a range of values.

Figure 4A:
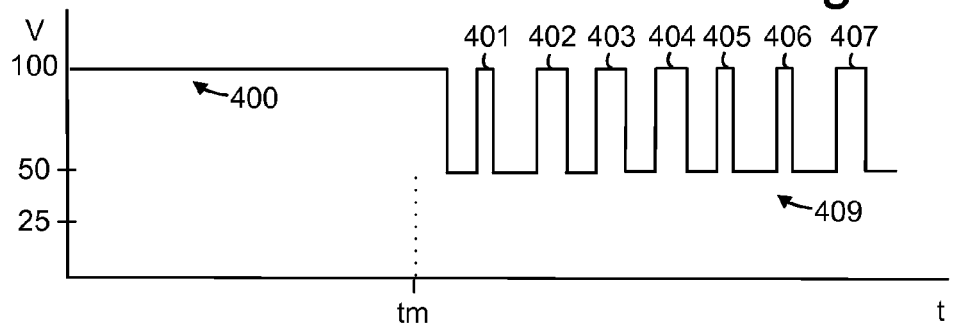
FIG. 4A depicts an example of a signal which includes an unmodified DC waveform portion 400 followed by a modified waveform portion 409 in which pulse width modulation is used to convey data.

As an alternative to the AC signal generator, a control may be used to generate any type of waveform in the modified signal. For example, different waveform shapes, duty cycles, frequencies, pulse widths and/or amplitudes may be used. Moreover, a waveform can comprises multiple bits of data according to a signaling technique such as by modulation of duty cycle, frequency, pulse width and/or amplitude. For example, the waveform portion 409 of FIG. 4A depicts pulse width modulation. Longer duration pulses 402, 403, 404 and 407 may represent a "0" while shorter duration pulses 401, 405 and 406 represent a "1." In this example, eight bits are transmitted in a byte, namely 01000110. An unmodified DC waveform portion 400 may be provided before the modified waveform portion, for instance. The pulses may be providing using a 50% pull down, for example.

Figure 4B:
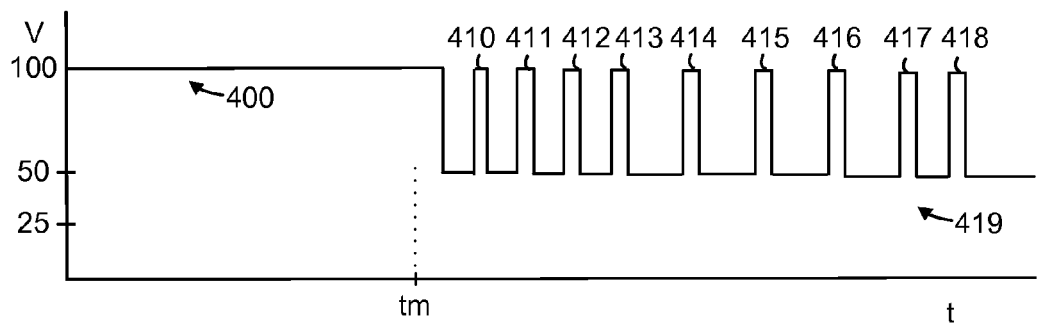
FIG. 4B depicts an example of a signal which includes the unmodified DC waveform portion 400 of FIG. 4A followed by a modified waveform portion 419 in which frequency modulation is used to convey data.

As another example, the waveform 419 of FIG. 4B depicts frequency modulation. The time period between pulses is the inverse of the frequency. For example, after the first pulse 410 which establishes a timing reference, the next three pulses 411-413 occur after a short period (representing a high frequency), the next four pulses 414-417 occur after a long period (representing a low frequency) and the last pulse 418 occurs after a short period (a representing a high frequency). A high frequency represents a "0" while a low frequency may represent a "1." In this example, eight bits are transmitted in a byte, namely 00011110. The unmodified DC waveform portion 400 may be provided before the modified waveform portion, for instance.

Figure 4C:
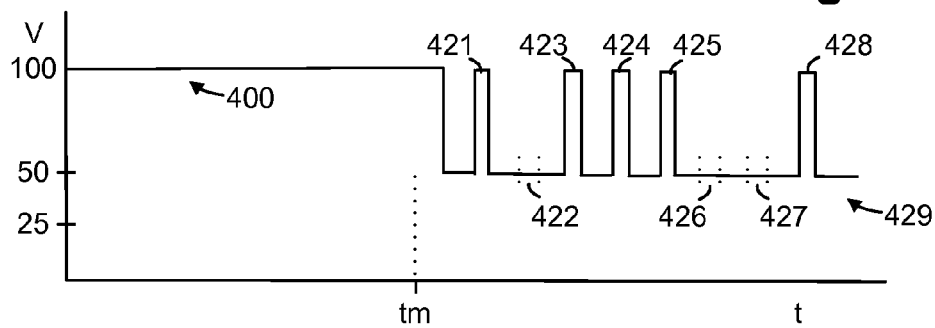

As another example, the waveform 429 of FIG. 4C depicts amplitude modulation. For example, a 100% amplitude may represent a "0" and a 50% amplitude may represent a "1." Pulses 421, 423-425 and 428 represent a 0, while pulses 422, 426 and 427 represent a 1. In this example, eight bits are transmitted in a byte, namely 0100110. The unmodified DC waveform portion 400 may be provided before the modified waveform portion, for instance.

Generally, the generator 151 generates a periodic signal to cause the switch (e.g., transistor Q3) to periodically open and close, to provide a periodic pull down a voltage of a signal received at the node N1 via the control line. Moreover, a message is transmitted on the control line by the periodic pull down of the voltage of the signal. The low pass filter provides a low pass filtered version of the signal with the voltage periodically pulled down to the output enable node 150, and the output enable node enables a function (such as a power supply) when an amplitude of the low pass filtered version of the signal is at a specified level (e.g., above or below a specific threshold or within a specific range).

FIG. 1G depicts a communication system SYS7 which is another example implementation of the communication system of FIG. 1A, including a first device 100E as a power supply unit which plugs into a wall socket (e.g., an AC mains power supply) and which is connected to a computing device as a second device 120E. Specifically, the first device is a power supply unit 100E which plugs into a wall socket as a power source 151 via a cord 162 and plug 161. The plug 161 includes three prongs: live, neutral and ground. The two prongs for live and neutral are connected via wires 163 and 164, and the one prong for ground is connected via wire 165, to the PSU 100E in a housing. The neutral wire is a current-carrying wire which is connected to ground and represents the wire 111, e.g., in FIG. 1A. The ground wire is a separate ground path for safety purposes which does not normally carry current.

Nodes N5-N7 may connect to wires 163-165, respectively. The PSU is connected to a second device 120E as a computing device via a cord 172 having a control line 173, a power line 174 and a ground line 175. The control line is connected to a power management unit 160, while the power and ground lines are connected to the powered component 125. The PSU is typically external to a computing device to save space and avoid introducing heat into the computing device. Optionally, PSU is internal to a computing device.

A power management unit is used in many computing devices. It may comprise a microcontroller that governs power functions of the computing device. It may have include firmware and software, memory, a CPU, input/output functions, timers to measure intervals of time, as well as analog to digital converters to measure the voltages of the main battery or power source of the computer. The power management unit may remain active due to power from a backup battery even when the computing device is shut down. The power management unit may perform tasks such as monitoring power connections and battery charges, charging batteries when necessary, controlling power to other integrated circuits, shutting down unnecessary system components when they are idle, and controlling sleep and power functions (on and off).

In one approach, the power supply unit comprises: at least one power supply connectable to an external alternating current mains power supply; a first end of a control line, the control line is connectable to a power management unit in a computing device; and a signal recognizer and a signal modifier both connected to the first end of the control line. The signal recognizer recognizes a message from the power management unit from a signal on the control line, the message from the power management unit relates to the at least one power supply, the signal modifier is responsive to the signal recognizer to provide a modification of the signal, the modification comprises at least one pull down of a voltage of the signal, the modification of the signal represents a message from the power supply unit which is recognizable to the power management unit, and the message from the power supply unit relates to the at least one power supply.

Figure 2A:
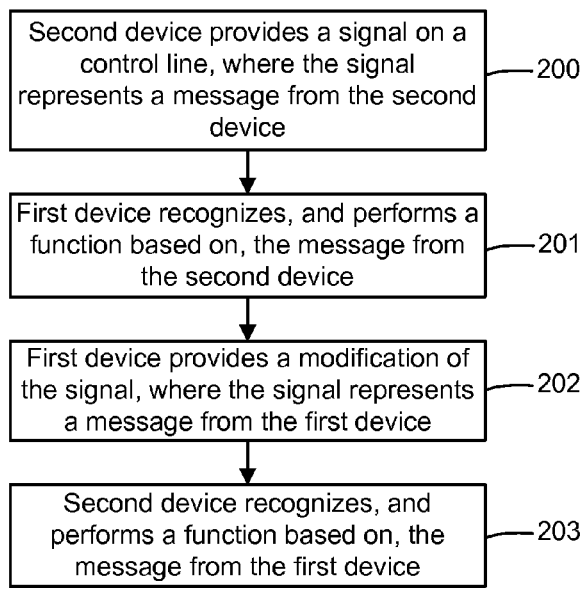
FIG. 2A depicts an example method in a communication system.

FIG. 2A depicts an example method in a communication system. The steps include: second device provides a signal on a control line, where the signal represents a message from the second device, 200; first device recognizes, and performs a function based on, the message from the second device, 201; first device provides a modification of the signal, where the signal represents a message from the first device, 202; and second device recognizes, and performs a function based on, the message from the first device, 203. Regarding step 200, in one approach, the second device initiates communication, although this is not required. The signal generator can be used to provide a signal with one or more characteristics which represent a message from the second device. For example, the message may represent a request to invoke a function at the first device. Or, the message may represent data which is reported by the second device, such as data from a sensor, status or diagnostic data and so forth.

Regarding step 201, the first device can perform one or multiple functions at the same time based on a request. Examples of functions include providing one or more power outputs and providing data or instructions to the second device. The first device can be configured to recognize one or more different predetermined signal characteristics. Regarding step 202, one or more modifications of the signal can be provided, e.g., to one or more of duty cycle, frequency, pulse width and amplitude. Regarding step 203, the second device can be configured to recognize one or more different predetermined signal characteristics. The second device can perform a function or action such as powering on a component, storing data, taking a reading from a sensor, and so forth. In one example, the second device provides sensor data to the first device, and the first device instructs the second device of when to take a next reading, based on a value of the reading provided to the first device. For example, if the first device determines that the readings are changing rapidly, the first device can instruct the second device to take the next reading relatively sooner. Or, if the value of the reading is outside a specified range, the first device can instruct the second device to take the next reading relatively sooner.

Figure 2B:
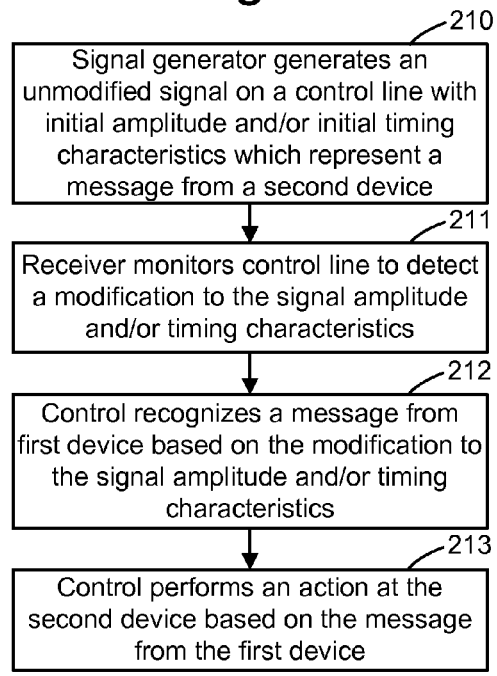
FIG. 2B depicts further details of steps 200 and 203 of FIG. 2A regarding a method of the second device in the communication system.
Figure 2C:
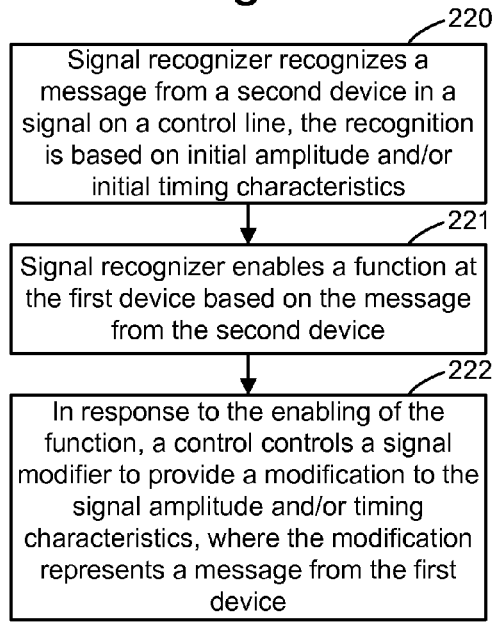
FIG. 2C depicts further details of steps 201 and 202 of FIG. 2A regarding a method of the first device in the communication system.

Aspects of the method of FIG. 2A are discussed further, e.g., in connection with FIGS. 2B and 2C.

FIG. 2B depicts further details of steps 200 and 203 of FIG. 2A regarding a method of the second device in the communication system. The steps include: signal generator generates an unmodified signal on a control line with initial amplitude and/or initial timing characteristics which represent a message from a second device, 210; receiver monitors control line to detect a modification to the signal amplitude and/or timing characteristics, 211; control recognizes a message from first device based on the modification to the signal amplitude and/or timing characteristics, 212; and control performs an action at the second device based on the message from the first device, 213.

Regarding step 210, the timing characteristics can relate to frequency, duty cycle or pulse width, for example.

Regarding step 211, the receiver may detect the modification to the signal immediately after the signal is initially generated, or after some delay. In one approach, the signal recognizer of the first device uses some finite amount of time (e.g., a few seconds) to conclude that the unmodified signal comprises a certain watched-for characteristic, to perform a requested function such as turning on a power supply and waiting for the power supply to indicate that it is ready, and to provide the corresponding signal modification when the power supply is ready. The receiver does not detect the signal modification until it is provided by the first device. In one approach, if the first device does not provide an expected signal modification within a specified amount of time, the second device can repeat the application of the signal on the control line.

Regarding step 212, as mentioned, the message can represent one or more bits of data. The message can comprise an acknowledgement that the signal was received, instructions, data and so forth. Regarding step 213, the control can perform an action such as turning on a powered component, storing data, and so forth. In one approach, the control at the second device causes the signal generator to provide a new signal to the first device based on the content of the message received from the first device.

FIG. 2C depicts further details of steps 201 and 202 of FIG. 2A regarding a method of the first device in the communication system. The steps include: signal recognizer recognizes a message from a second device in a signal on a control line, the recognition is based on initial amplitude and/or initial timing characteristics, 220; signal recognizer enables a function at the first device based on the message from the second device, 221; and in response to the enabling of the function, a control controls a signal modifier to provide a modification to the signal amplitude and/or timing characteristics, where the modification represents a message from the first device, 222.

Regarding step 220, the signal recognizer of the first device determines that the unmodified signal comprises one or more certain characteristics. Regarding step 221, one or more functions can be enabled when the presence of the one or more certain characteristics is recognized. In one approach, one or more functions are disabled when the presence of the one or more certain characteristics is recognized. In another possible approach, when the presence of the one or more certain characteristics is recognized, one or more functions are disabled and concurrently one or more other functions are enabled. Regarding step 222, a control such as a microprocessor can be used to cause the signal modification. However, a microprocessor is not required. For example, as discussed, in the circuit of FIG. 1F, the PSU output enable component 150 can activate the AC signal generator to modify the signal. The message from the second device can be a request for the first device to perform a function, and the message from the first device can indicate to the second device that the function has been performed.

FIGS. 3A-4C depict example waveforms of signals which can be used on a control line in a communication system as described herein, where each signal includes an initial unmodified waveform portion followed by a modified waveform portion. Some aspects of these waveforms have been discussed previously. In FIGS. 3B-3H, a minimum waveform level is a non-zero level but a pull down to ground could alternatively be used.

FIG. 3A depicts an example of a signal which includes an unmodified DC waveform portion 300 or 302 at an initial level, followed by a modified DC waveform portion 302 or 303, respectively, at a reduced DC level. A waveform portion 300 is an unmodified signal at an amplitude of 100% of a reference peak level, while a waveform portion 301 is a modified signal is at an amplitude of 50%. This represents a pull down to 50% of the peak amplitude of the unmodified signal by the first device. A pull down refers to a reduction in voltage of a signal to a reduced level which can be at ground or higher. Generally, the modification of a signal can involve one or more pull downs. In some case, the pull downs occur periodically. The modification can comprise one or more pull downs of a voltage of the signal so that the first device does not add power to the signal to provide the modification of the signal.

A waveform portion 302 is an unmodified signal at an amplitude of 30%, while a waveform portion 303 is a modified signal is at an amplitude of 15%. This also represents a pull down to 50% of the peak amplitude of the unmodified signal by the first device. The waveform portion 300 may represent one message from the second device, and the waveform portion 302 may represent another message from the second device. The time "tm" indicates a time at which the modified signal begins and the unmodified signal ends.

Thus, the unmodified signal has an amplitude, and the signal recognizer recognizes the message from the second device based on the amplitude.

The first device can provide a modification of the unmodified signal to provide the modified signal by reducing an amplitude of the signal from an initial level (e.g., 100% or 30%) to a reduced level (e.g., 50% or 15%), and the receiver of the second device can recognize the message from the first device based on the amplitude of the signal being at the reduced level.

FIG. 3B depicts an example of a signal which includes the unmodified DC waveform portion 300 of FIG. 3A, followed by a modified AC portion 310 having a first frequency 1/tpa and a first duty cycle ta1/tpa. The waveform portion 300 is the same as in FIG. 3A. The waveform portion 310 comprises pulses such as example pulse 311 at a fixed frequency, duty cycle and peak amplitude. Duty cycle can be defined as the time in which a pulse in a waveform is active or high divided by a time period of the waveform. For example, with an active time of ta1 and a time period of tpa, the duty cycle is ta1/tpa. The first device can set the duty cycle based on the timing of the pull down. A shorter pull down duration results in a larger duty cycle. An LPF level 312 is also depicted which results from low pass filtering of the waveform portion 310. Compared to other examples herein, the waveform portion 310 has a relatively low frequency. Frequency is the inverse of the time period tpa.

FIG. 3C depicts an example of a signal which includes the unmodified DC waveform portion 300 of FIG. 3A, followed by a modified AC waveform portion 320 having a second frequency 1/tpb. The waveform portion 300 is the same as in FIG. 3A. The waveform portion 320 comprises pulses such as example pulse 321 at a fixed frequency of 1/tpb, duty cycle and peak amplitude. An LPF level 322 is also depicted which results from low pass filtering of the waveform portion 320. The waveform portion 320 has a relatively high frequency. As an example, the frequency of FIG. 3B represents one message and the frequency of FIG. 3C represents another message.

FIG. 3D depicts an example of a signal which includes the unmodified DC waveform portion 300 of FIG. 3A, followed by a modified AC portion 330 having the first frequency 1/tpa of FIG. 3B and a second duty cycle ta2/tpa. The waveform portion 300 is the same as in FIG. 3A. The waveform portion 330 comprises pulses such as example pulse 331 at a fixed frequency, duty cycle and peak amplitude. Here, the duty cycle is smaller than in FIG. 3B. As an example, the duty cycle of FIG. 3B represents one message and the duty cycle of FIG. 3D represents another message. It is also possible to provide a message by modulating duty cycle or pulse width such as depicted in FIG. 4A.

The unmodified signal can comprise a waveform portion 340 characterized by a respective frequency, where the signal recognizer recognizes the message from the second device based on the respective frequency. Additionally or alternatively, the signal recognizer can recognize the message from the second device based on the amplitude of the modified signal (e.g., the peak amplitude of 100%).

FIG. 3E depicts an example of a signal which includes an unmodified AC waveform portion 340, followed by a modified AC waveform portion 342 at a reduced amplitude, where the frequency 1/tpa of FIG. 3B and duty cycle are constant through the signal. The waveform portion 340 comprises pulses such as example pulse 341 having a peak amplitude of 100% and a frequency of 1/tpa as in FIG. 3B. The waveform portion 342 comprises pulses such as pulse 343 at the same frequency and duty cycle as the waveform portion 340 but with a peak amplitude of 50% and a minimum amplitude of 25%, both representing a 50% reduction compared to the waveform portion 340.

FIG. 3F depicts an example of a signal which includes an unmodified AC waveform portion 350, followed by a modified AC waveform portion 352 at a first reduced amplitude (50% reduction), where the frequency 1/tpb of FIG. 3C and duty cycle are constant through the signal. The waveform portion 350 comprises pulses such as example pulse 351 having a peak amplitude of 100% and a frequency of 1/tpb as in FIG. 3C. The waveform portion 352 comprises pulses such as example pulse 353 at the same frequency and duty cycle as the waveform portion 350 but with a peak amplitude of 50% and a minimum amplitude of 25%, both representing a 50% reduction compared to the waveform portion 350. As an example, the frequency of FIG. 3E represents one message and frequency of FIG. 3F represents another message.

FIG. 3G depicts an example of a signal which includes an unmodified AC waveform portion 350, followed by a modified AC waveform portion 358 at a second reduced amplitude (75% reduction), where the frequency 1/tpb of FIG. 3C and duty cycle are constant through the signal. The waveform portion 350 is the same as in FIG. 3F. The waveform portion 358 comprises pulses such as example pulse 359 at the same frequency and duty cycle as the waveform portion 350 but with a peak amplitude of 25%. As an example, the 50% peak amplitude of the waveform portion 352 in FIG. 3F represents one message and 25% peak amplitude of the waveform portion 358 in FIG. 3G represents another message.

Figure 3H:
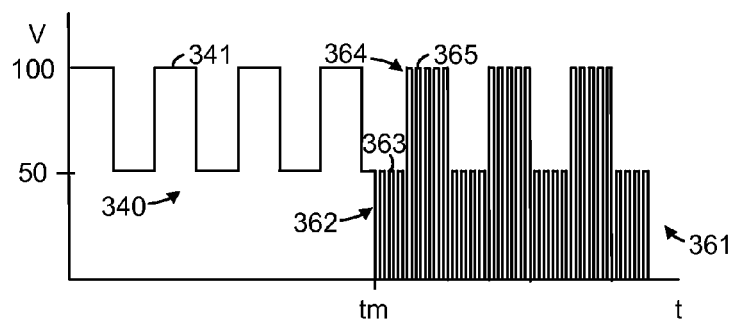
FIG. 3H depicts an example of a signal which includes the unmodified AC portion 340 of FIG. 3E having a first frequency, followed by a modified AC waveform portion 361 which is obtained by modulating the unmodified AC portion 340 at a higher frequency.

FIG. 3H depicts an example of a signal which includes the unmodified AC waveform portion 340 of FIG. 3E having a first frequency, followed by a modified AC waveform portion 361 which is obtained by modulating the unmodified AC waveform portion 340 at a higher frequency. The waveform portion 340 is the same as in FIG. 3E and is the unmodified signal, having low frequency pulses. The waveform portion 361 provides the modified signal which comprises the low frequency pulses in addition to high frequency pulses as imparted by the first device. For example, with a 75% pull down, the peak amplitude of 100% in the unmodified signal becomes a peak amplitude of 75% in the modified signal, and the minimum amplitude of 75% in the unmodified signal becomes a minimum amplitude of 25% in the modified signal.

A group of higher frequency pulses 362 including example pulse 363 is provided when the output from the signal generator of the second device is at a minimum, while another group of higher frequency pulses 364 including example pulse 365 is provided when the output from the signal generator of the second device is at a peak. The waveform portion 361 can be recognized concurrently by the first device as comprising the lower frequency pulses, and by the second device as comprising the higher frequency pulses. As an example, the lower frequency pulses represent a message from the second device and higher frequency pulses represent a message from the first device.

Figure 3I:
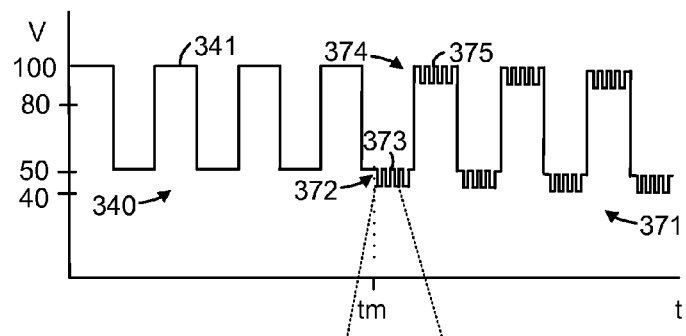
FIG. 3I depicts an example of a signal which includes the unmodified AC portion 340 of FIG. 3E having a first frequency, followed by a modified AC portion 371 which is obtained by modulating the unmodified AC portion 340 at a higher frequency with a 20% voltage reduction.
Figure 3J:
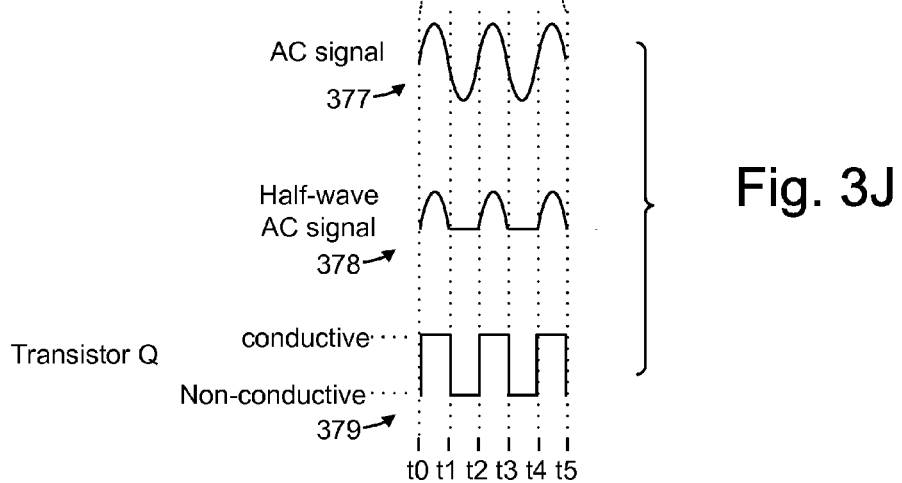
FIG. 3J depicts an AC signal 377, a half-wave AC signal 378 which is formed from the AC signal 377, and a waveform portion 379 indicating a conductive or non-conductive status of a transistor, responsive to the half-wave AC signal 378, which can be used in the system of FIG. 1F to provide the higher frequency modulation in FIG. 3I.

FIG. 3I depicts an example of a signal which includes the unmodified AC waveform portion 340 of FIG. 3E having a first frequency, followed by a modified AC waveform portion 371 which is obtained by modulating the unmodified AC waveform portion 340 at a higher frequency with a 20% voltage reduction. The waveform portion 340 is the same as in FIG. 3E and is the unmodified signal, having low frequency pulses. The waveform portion 371 provides the modified signal which comprises the low frequency pulses in addition to high frequency pulses as imparted by the first device. In this case, a 20% reduction is used. For example, with a 20% reduction, the peak amplitude of 100% in the unmodified signal becomes a peak amplitude of 80% in the modified signal, and the minimum amplitude of 50% in the unmodified signal becomes a minimum amplitude of 40% in the modified signal.

A group of higher frequency pulses 372, including example pulse 373, is provided when the output from the signal generator of the second device is at a minimum, while another group of higher frequency pulses 374 including example pulse 375 is provided when the output from the signal generator of the second device is at a peak. The waveform portion 371 can be recognized concurrently by the first device as comprising the lower frequency pulses, and by the second device as comprising the higher frequency pulses. As an example, the lower frequency pulses represent a message from the second device and higher frequency pulses represent a message from the first device. In another example, the higher frequency pulses with the 50% pull down in the waveform portion 361 of FIG. 3H represent one message from the first device, and the higher frequency pulses with the 20% pull down in the waveform portion 371 of FIG. 3I represent another message from the first device.

FIG. 3J depicts an AC signal 377, a half-wave AC signal 378 which is formed from the AC signal 377, and a waveform portion 379 indicating a conductive or non-conductive status of a transistor, responsive to the half-wave AC signal 378, such as for use in the system of FIG. 1F to provide the higher frequency modulation in FIG. 3I. As discussed in connection with FIG. 1F, the AC signal generator 151 is part of a signal modifier of the first device and can be used to generate a period pull down of the signal on the control line. While the AC signal generator 151 is depicted in connection with the set of higher frequency pulses 372, it can also be used by the first device to impart a frequency such as depicted in the modified signals of FIGS. 3B, 3C, 3D and 3H.

An AC signal, such as depicted by the signal 377, is half-wave rectified to provide the half-wave AC signal 378. The half-wave AC signal can cause a switch (such as the transistor Q3 in FIG. 1F) to switch between conductive and non-conductive states, such as depicted by the waveform portion 379. When the switch is in a conductive state, the signal is pulled down and when the switch is in a non-conductive state, the signal is not pulled down.

FIG. 4A depicts an example of a signal which includes an unmodified DC waveform portion 400 followed by a modified waveform portion 409 in which pulse width modulation is used to convey data. Pulse width is comparable to duty cycle. As mentioned previously, the longer duration pulses 402, 403, 404 and 407 may represent a "0" while the shorter duration pulses 401, 405 and 406 represent a "1." In this example, eight bits are transmitted in a byte, namely 01000110.

FIG. 4B depicts an example of a signal which includes the unmodified DC waveform portion 400 of FIG. 4A followed by a modified waveform portion 419 in which frequency modulation is used to convey data. As mentioned previously, after the first pulse 410 which establishes a timing reference, the next three pulses 411-413 occur after a short period (representing a high frequency), the next four pulses 414-417 occur after a long period (representing a low frequency) and the last pulse 418 occurs after a short period (a representing a high frequency). A high frequency represents a "0" while a low frequency may represent a "1." In this example, eight bits are transmitted in a byte, namely 0011110. The amount of data can be, e.g., one or more bytes.

FIG. 4C depicts an example of a signal which includes the unmodified DC waveform portion 400 of FIG. 4A followed by a modified waveform portion 429 in which amplitude modulation is used to convey data. As mentioned previously, a 100% amplitude may represent a "0" and a 50% amplitude may represent a "1." Pulses 421, 423-425 and 428 represent a 0, while pulses 422, 426 and 427 represent a 1. In this example, eight bits are transmitted in a byte, namely 0100110.

Figure 5:
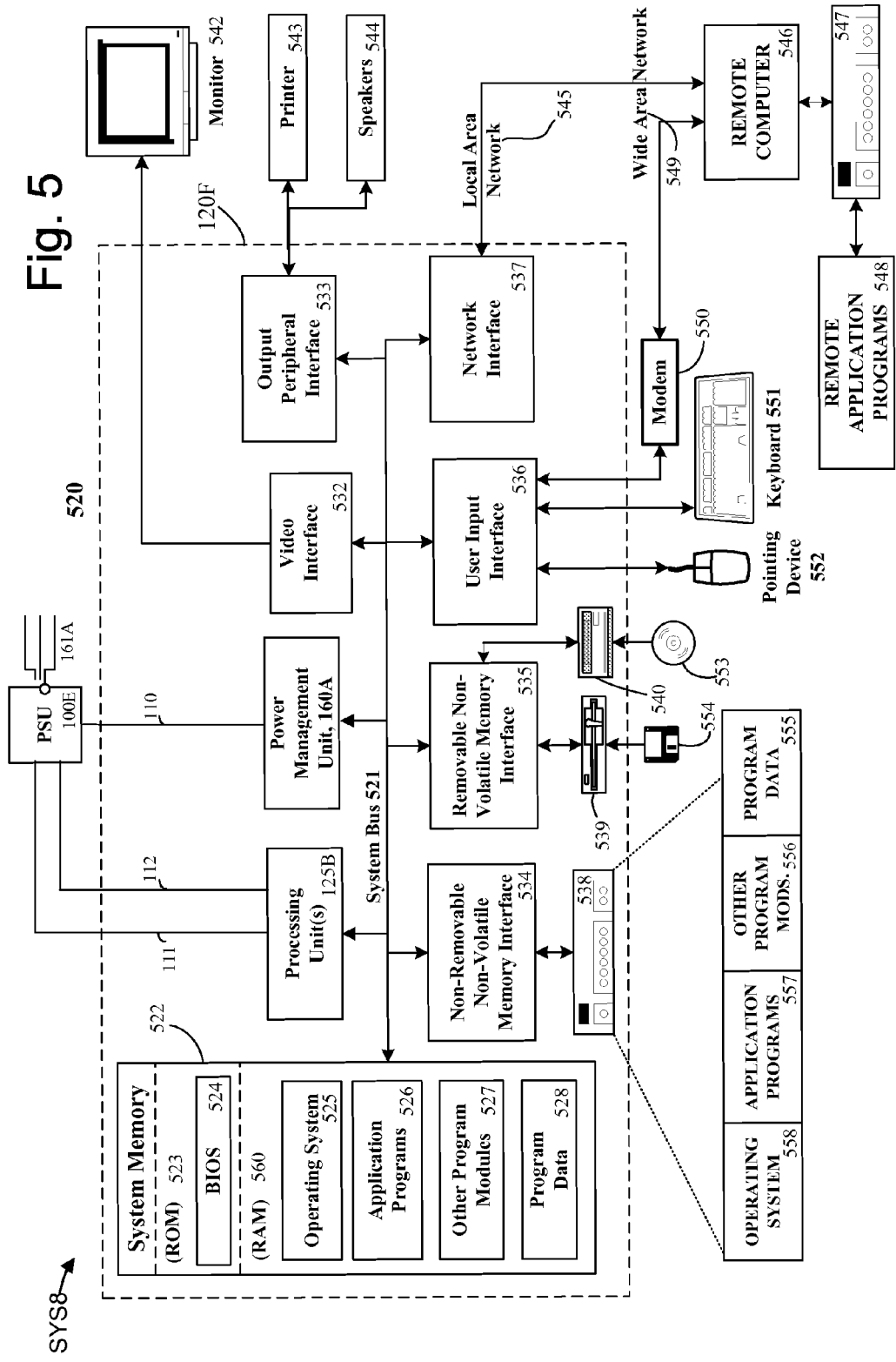
FIG. 5 is a block diagram of a communication system SYS8, which is another example implementation of the communication system of FIG. 1A.

FIG. 5 is a block diagram of a communication system SYS8, which is another example implementation of the communication system of FIG. 1A. The communication system includes a computing device 120F (or the power management unit 160A, specifically) as an example of a first device and a PSU 100E as an example of a second device.

The computing device 120F is one example of a suitable computing device and is not intended to suggest any limitation as to the scope of use or functionality of the presently disclosed subject matter. In some implementations the various depicted computing elements may include circuitry configured to instantiate specific aspects of the present disclosure. For example, the term circuitry used in the disclosure can include specialized hardware components configured to perform function(s) by firmware or switches. In other examples implementations the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The computing device 120F can include a variety of non-transitory computer readable media. Computer readable media can be any available media that can be accessed by computing device 120F and includes both volatile and nonvolatile media, removable and non-removable media. The system memory 522 includes computer storage media in the form of volatile and/or nonvolatile memory such as read only memory (ROM) 523 and random access memory (RAM) 560. A basic input/output system 524 (BIOS), containing the basic routines that help to transfer information between elements within the computer, such as during start-up, is typically stored in ROM 523. RAM 560 typically contains data and/or program modules that are immediately accessible to and/or presently being operated on by processing unit 125B. By way of example, and not limitation, the figure illustrates operating system 525, application programs 526, other program modules 527, and program data 528.

The computing device 102F may also include other removable/non-removable, volatile/nonvolatile computer storage media. For example, the figure illustrates a hard disk drive 538 that reads from or writes to non-removable, nonvolatile magnetic media, a magnetic disk drive 539 that reads from or writes to a removable, nonvolatile magnetic disk 554, and an optical disk drive 540 that reads from or writes to a removable, nonvolatile optical disk 553 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 521 through a non-removable memory interface such as interface 534, and magnetic disk drive and optical disk drive are typically connected to the system bus 521 by a removable memory interface, such as interface 535.

The drives and their associated computer storage media discussed above and illustrated in the figure provide storage of computer readable instructions, data structures, program modules and other data for the computing device 102F. For example, hard disk drive 538 is illustrated as storing operating system 558, application programs 557, other program modules 556, and program data 555. Note that these components can either be the same as or different from operating system 525, application programs 526, other program modules 527, and program data 528. Operating system 558, application programs 557, other program modules 556, and program data 555 are given different numbers here to illustrate that, at a minimum, they are different copies. A user may enter commands and information into the computing device 102F through input devices such as a keyboard 551 and pointing device 552, commonly referred to as a mouse, trackball or touch pad. Other input devices (not shown) may include a microphone (voice control), joystick, game pad, satellite dish, scanner, a motion sensor (gesture control), or the like. These and other input devices are often connected to the processing unit 125B through a user input interface 536 that is coupled to the system bus, but may be connected by other interface and bus structures, such as a parallel port, game port or a universal serial bus (USB). A motion detection camera and capture device may define additional input devices that connect via user input interface 536. A monitor 542 or other type of display device is also connected to the system bus 521 via an interface, such as a video interface 532. In addition to the monitor, computers may also include other peripheral output devices such as speakers 544 and printer 543, which may be connected through an output peripheral interface 533.

The computing device 102F may operate in a networked environment using logical connections to one or more remote computers, such as a remote computer 546. The remote computer 546 may be a personal computer, a game console, a server, a router, a network PC, a peer device or other common network node, and typically includes many or all of the elements described above relative to the computing device 102F, although a memory storage device 547 has been illustrated. The logical connections depicted include a local area network (LAN) 545 and a wide area network (WAN) 549, but may also include other networks. Such networking environments are commonplace in offices, enterprise-wide computer networks, intranets and the Internet.

When used in a LAN networking environment, the computing device 102F is connected to the LAN 545 through a network interface or adapter 537. When used in a WAN networking environment, the computing device 102F typically includes a modem 550 or other means for establishing communications over the WAN 549, such as the Internet. The modem 550, which may be internal or external, may be connected to the system bus 521 via the user input interface 536, or other appropriate mechanism. In a networked environment, program modules depicted relative to the computing device 102F, or portions thereof, may be stored in the remote memory storage device. Application programs 548 may reside on memory device 547, for example. It will be appreciated that the network connections shown are exemplary and other means of establishing a communications link between computing platforms may be used.

The PSU 100E is detachably plugged into an AC mains power supply via a cord and plug 161A. The PSU 100E can be detachably plugged into, or is permanently attached to, the computing device 120F. A power management unit 160A communicates with the PSU. A processing unit 125B is an example of a powered component which can be powered by the PSU. For example, the processing unit 125B may have the ability to operate at different power levels, such as based on a current processing load. With a high load, the processing unit 125B can request a high power (e.g., +12 V high power) from the power management unit 160A. In response, the power management unit 160A communicates with the PSU via control line 110 to request the high power output. The PSU in turn provides the high power output to the processing unit 125B via the power line 112 and ground line 111. With a low load, the processing unit 125B can request a low power (e.g., +12 V low power) from the power management unit 160A. In response, the power management unit 160A communicates with the PSU via control line 110 to request the low power output. The PSU in turn provides the low power output to the processing unit 125B via the power line 112 and ground line 111. A low power output can be used as a standby power and/or sleep mode power.

Figure 6:
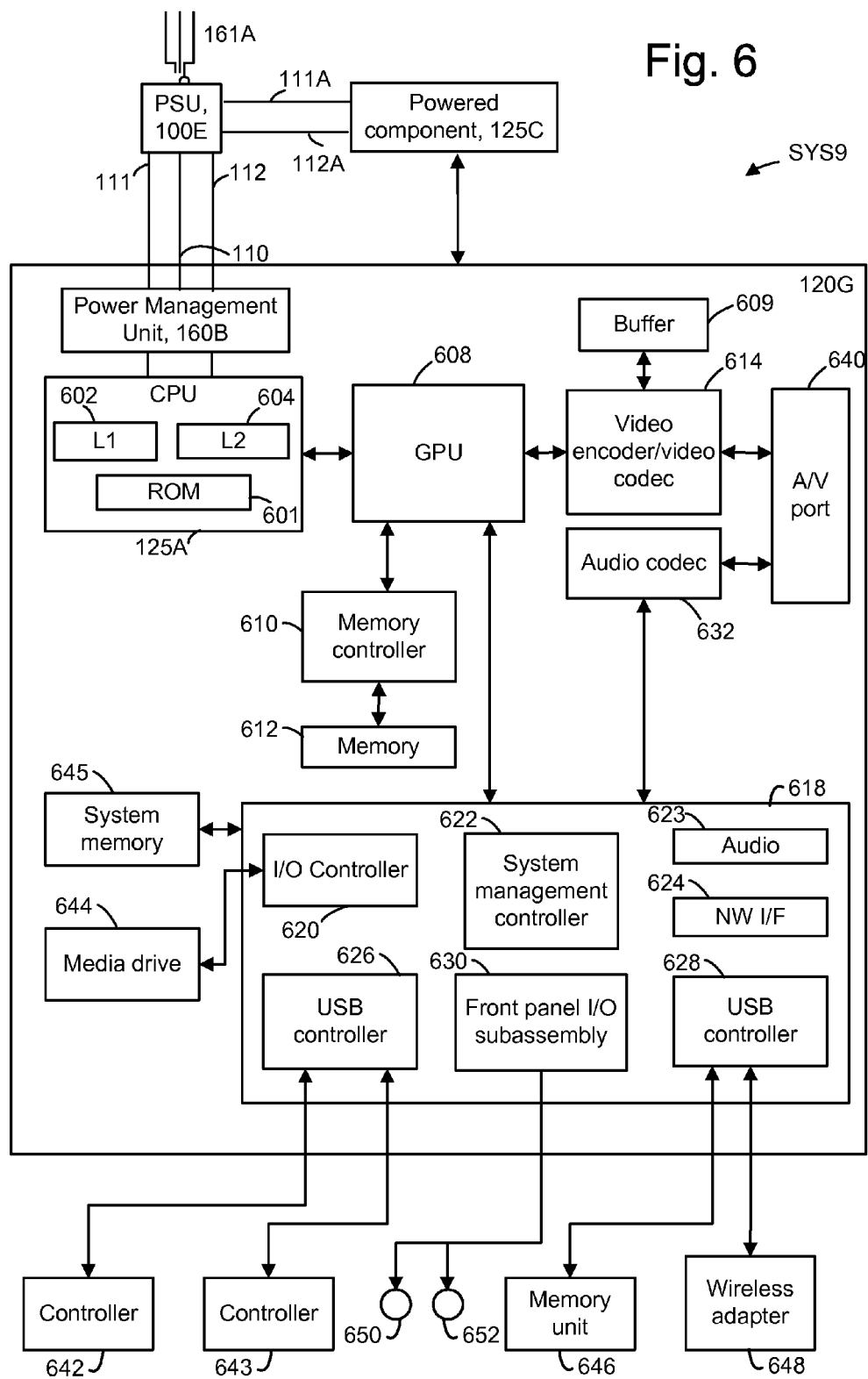
FIG. 6 is a block diagram of a communication system SYS9, which is another example implementation of the communication system of FIG. 1A.

FIG. 6 is a block diagram of a communication system SYS9, which is another example implementation of the communication system of FIG. 1A. The communication system includes a computing device 120G (or the power management unit 160B, specifically) as an example of a first device and the PSU 100E as an example of a second device. The computing device may be a multimedia device/gaming console with Internet connectivity, for instance.

A central processing unit (CPU) 125A is an example of a powered component. The CPU has a level 1 (L1) cache 602, a level 2 (L2) cache 604, and a flash ROM (Read Only Memory) 606. The L1 cache 602 and L2 cache 604 temporarily store data and hence reduce the number of memory access cycles, thereby improving processing speed and throughput. The CPU 125A may have more than one core, and thus, additional level 1 and level 2 caches 602 and 604. The flash ROM 606 may store executable code that is loaded during an initial phase of a boot process when the multimedia console is powered on.

A graphics processing unit (GPU) 608 and a video encoder/video codec (coder/decoder) 614 form a video processing pipeline for high speed and high resolution graphics processing. The coder/decoder 614 may access a buffer 609 for buffering frames of video. Data is carried from the GPU 608 to the coder/decoder 614 via a bus. The video processing pipeline outputs data to an A/V (audio/video) port 640 for transmission to a television or other display. A memory controller 610 is connected to the GPU 608 to facilitate processor access to various types of memory 612, such as RAM (Random Access Memory).

The multimedia console includes an I/O controller 620, a system management controller 622, an audio processing unit 623, a network interface 624, a first USB host controller 626, a second USB controller 628 and a front panel I/O subassembly 630 that are preferably implemented on a module 618. The USB controllers 626 and 628 serve as hosts for peripheral controllers 642 and 643, such as game controllers, a wireless adapter 648, and an external memory unit 646 (e.g., flash memory, external CD/DVD ROM drive, removable media, etc.) The network interface (NW IF) 624 and/or wireless adapter 648 provide access to a network (e.g., the Internet, home network, etc.) and may include wired or wireless adapter components including an Ethernet card, a modem, a Bluetooth module, a cable modem, and the like.

System memory 645 is provided to store application data that is loaded during the boot process. A media drive 644 may comprise a DVD/CD drive, hard drive, or other removable media drive. The media drive 644 may be internal or external to the multimedia console. Application data may be accessed via the media drive 644 for execution, playback, etc. by the multimedia console. The media drive 644 is connected to the I/O controller 620 via a bus, such as a Serial ATA bus or other high speed connection.

The system management controller 622 provides a variety of service functions related to assuring availability of the multimedia console. The audio processing unit 623 and an audio codec 632 form an audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the multimedia console. A power management unit 160B provides power to the components of the multimedia console.

The CPU 125A, GPU 608, memory controller 610, and various other components within the multimedia console are interconnected via one or more buses, including serial and parallel buses, a memory bus, a peripheral bus, and a processor or local bus using any of a variety of bus architectures.

When the multimedia console is powered on, application data may be loaded from the system memory 645 into memory 612 and/or caches 602, 604 and executed on the CPU 125A. The application may present a graphical user interface that provides a consistent user experience when navigating to different media types available on the multimedia console. In operation, applications and/or other media contained within the media drive 644 may be launched or played from the media drive 644 to provide additional functionalities to the multimedia console.

The multimedia console may be operated as a standalone system by simply connecting the system to a television or other display. In this standalone mode, the multimedia console allows one or more users to interact with the system, watch movies, or listen to music. However, with the integration of broadband connectivity made available through the network interface 624 or the wireless adapter 648, the multimedia console may further be operated as a participant in a larger network community.

When the multimedia console is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

After the multimedia console boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 125A at predetermined times and intervals to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager controls the gaming application audio level when system applications are active.

Input devices (e.g., controllers 642 and 643) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The computing environment can include tangible computer readable storage having computer readable software embodied thereon for programming at least one processor to perform methods as described herein. The tangible computer readable storage can include, e.g., one or more of components 602, 604, 606, 612, 645 and 646. Further, one or more processors of the computing environment can provide a processor-implemented method comprising processor-implemented steps as described herein. A processor can include, e.g., one or more of CPU 125A and memory controller 610.

The PSU 100E is plugged into an AC mains power supply via a cord and plug 161A. PSU 100E can be plugged into the computing device 120G. The CPU 125A is an example of a powered component which can be powered by the PSU. The CPU can request a certain power output from the power management unit 160B. In response, the power management unit 160B communicates with the PSU via control line 110 to request the specific power output. The PSU in turn provides the specific power output to the CPU via the power line 112 and ground line 111. In another approach, the power management unit determines an appropriate power supply level and requests it from the PSU. In another approach, the power management unit determines an available power supply level and/or AC mains frequency of the PSU and instructs the CPU to operate based on this level and/or AC mains frequency. Many other options are possible.

The PSU 100E can also provide power to an additional powered component 125C which is external to the computing device 120G, for instance. The powered component 125C may communicate with the multimedia console and can be, e.g., a camera, sensor or any other device. In one approach, the power management unit detects the presence of the powered component 125C and requests the PSU to provide an appropriate or requested power output to the powered component 125C via the power line 112A and ground line 111A.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication system, comprising:
a first device comprising a signal recognizer connected to a first end of a control line, and a path to ground connected to the first end of the control line, the path to ground comprising a first transistor and a first resistor with a resistance R1A; and
a second device comprising a signal generator connected to a second end of the control line via a second resistor with a resistance R2, the second device also comprises a receiver connected to the second end of the control line, wherein:
the signal generator is configured to generate a signal at the second end of the control line;
the signal represents a message from the second device;
the signal recognizer is configured to recognize the message from the second device from the signal;
first transistor is switchable between a conductive state and a non-conductive state responsive to the signal recognizer to provide a modification of the signal;
when the first transistor is in the conductive state, a voltage V of the signal is divided between the first resistor and the second resistor;
the modification of the signal represents a message from the first device; and
the receiver of the second device is configured to recognize the message from the first device from the modification of the signal.

2. The communication system of claim 1, wherein:
the modification of the signal imparts a respective frequency to the signal by pulling down the voltage V of the signal at the respective frequency; and
the receiver of the second device is configured to recognize the message from the first device based on the respective frequency.

3. The communication system of claim 2, wherein:
the signal comprises a waveform characterized by a first frequency, different than the respective frequency; and
the signal recognizer is configured to recognize the message from the second device based on the first frequency.

4. The communication system of claim 2, wherein:
the signal has an amplitude; and
the signal recognizer is configured to recognize the message from the second device based on the amplitude.

5. The communication system of claim 1, wherein:
the modification of the signal reduces an amplitude of the signal from an initial level which is the voltage V to a non-zero reduced level which is $V \times R1A/(R1A+R2)$; and
the receiver of the second device is configured to recognize the message from the first device based on the amplitude of the signal being at the non-zero reduced level.

6. The communication system of claim 5, wherein:
the signal comprises a waveform characterized by a respective frequency; and
the signal recognizer is configured to recognize the message from the second device based on the respective frequency.

7. The communication system of claim 5, wherein:
the signal recognizer is configured to recognize the message from the second device based on an initial amplitude of the signal, before the modification of the signal.

8. The communication system of claim 1, wherein:
the first device is a power supply unit which plugs into an alternating current mains power supply;
the message from the second device is a request for the first device to provide a first power output from among a plurality of power outputs of the first device; and
the message from the first device indicates to the second device that the first power output is ready on a power line, separate from the control line.

9. The communication system of claim 1, wherein:
the control line is one wire; and
communication between the first device and the second device is bidirectional and concurrent over the one wire.

10. The communication system of claim 1, wherein:
the message from the second device is a request for the first device to identify a frequency of an alternating current mains used by the first device; and
the message from the first device identifies the frequency.

11. The communication system of claim 1, wherein:
the modification comprises one or more pull downs of a the voltage V of the signal so that the first device does not add power to the signal to provide the modification of the signal.

12. The communication system of claim 1, wherein:
the first device is a power supply unit which plugs into an alternating current mains power supply;
the modification comprises a periodic pull down of the voltage V of the signal responsive to the alternating current mains power supply; and
a low pass filter provides a low pass filtered version of the signal with the voltage periodically pulled down to a power output enable node.

13. The communication system of claim 1, wherein:
when the first transistor is in the non-conductive state, the voltage V is provided at the first end and the second end; and
when the first transistor is in the conductive state, a voltage V×R1A/(R1A+R2) is provided at the first end and the second end.

14. The communication system of claim 1, wherein:
the first device comprises another path to ground connected to the first end of the control line, the another path to ground comprises a second transistor and a third resistor with a resistance R1B, and R1B is different than R1A;
the second transistor is switchable between the conductive state and the non-conductive state responsive to the signal recognizer to provide another modification of the signal; and
when the second transistor is in the conductive state, the voltage V of the signal is divided between the third resistor and the second resistor.

15. A power supply unit, comprising:
at least one power supply connectable to an external alternating current mains power supply;
a first end of a control line, the control line is connectable to a power management unit in a computing device; and
a signal recognizer and a signal modifier both connected to the first end of the control line, the signal recognizer is configured to recognize a message from the power management unit from a signal on the control line, the message from the power management unit relates to the at least one power supply, the signal modifier is responsive to the signal recognizer to provide a modification of the signal, the modification comprises at least one pull down of a voltage of the signal by a specified percentage to a non-zero voltage, the modification of the signal represents a message from the power supply unit which is recognizable to the power management unit, and the message from the power supply unit relates to the at least one power supply.

16. The power supply unit of claim 15, wherein:
the modification comprises a periodic pull down of the voltage of the signal by the specified percentage to the non-zero voltage responsive to the external alternating current mains power supply.

17. The power supply unit of claim 15, wherein:
the message from the power management unit comprises a request to identify a frequency of the external alternating current mains power supply; and
the message from the power supply unit identifies the frequency.

18. The power supply unit of claim 15, wherein:
the message from the power management unit comprises a request for a specific power output;
the at least one power supply provides the specific power output on a power line, responsive to the signal recognizer; and
the message from the power supply unit indicates that the specific power output is ready.

19. A method for bidirectional communication, comprising:
transmitting a signal to a first device via a control line, the signal is generated by a second device and represents a message from the second device;
recognizing a modification of the signal which is provided by the first device in response to the message, the modification comprises one or more pull downs of a voltage of the signal to a non-zero voltage using a voltage divider so that power is not added to the signal to provide the modification of the signal; and
identifying a message from the first device based on the modification of the signal, the message from the second device and the message from the first device are communicated bidirectionally and concurrently on the control line.

20. The method of claim 19, wherein:
the message from the second device is a request for the first device to provide a first power output;
the message from the second device is characterized by at least one of a frequency, a pulse width, a duty cycle or an amplitude of the signal;
the message from the first device indicates to the second device that the first power output is ready on a power line, separate from the control line; and
the second device accesses the first power output on the power line in response to the message from the first device.

* * * * *